United States Patent
Khozikov et al.

(10) Patent No.: US 8,162,610 B1
(45) Date of Patent: *Apr. 24, 2012

(54) ACTIVE DIRECTIONAL CONTROL OF AIRFLOWS OVER WIND TURBINE BLADES USING PLASMA ACTUATING CASCADE ARRAYS

(75) Inventors: Vyacheslav Khozikov, Seattle, WA (US); Shengyi Liu, Sammamish, WA (US); George M. Roe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 334 days.

This patent is subject to a terminal disclaimer.

(21) Appl. No.: 12/472,116

(22) Filed: May 26, 2009

(51) Int. Cl.
*F03D 11/00* (2006.01)
(52) U.S. Cl. .................................. 416/146 R
(58) Field of Classification Search .............. 416/146 R; 244/205
See application file for complete search history.

(56) References Cited

U.S. PATENT DOCUMENTS

| | | | |
|---|---|---|---|
| 3,095,163 A | 6/1963 | Hill | |
| 4,519,743 A | 5/1985 | Ham | |
| 5,224,826 A | 7/1993 | Hall et al. | |
| 6,033,180 A | 3/2000 | Machida | |
| 6,092,990 A | 7/2000 | Hassan et al. | |
| 6,793,177 B2 | 9/2004 | Bonutti | |
| 6,796,533 B2 | 9/2004 | Barrett et al. | |
| 7,028,954 B2 * | 4/2006 | Van Dam et al. | 244/204 |
| 7,281,318 B2 | 10/2007 | Marshall et al. | |
| 7,380,756 B1 | 6/2008 | Enloe et al. | |
| 7,387,491 B2 | 6/2008 | Saddoughi et al. | |
| 2008/0023589 A1 * | 1/2008 | Miles et al. | 244/205 |
| 2010/0127624 A1 | 5/2010 | Roy | |
| 2011/0150649 A1 * | 6/2011 | White et al. | 416/61 |

FOREIGN PATENT DOCUMENTS

| | | |
|---|---|---|
| EP | 1930546 | 6/2008 |
| EP | 1995171 | 11/2008 |
| WO | 2008016928 | 2/2008 |

OTHER PUBLICATIONS

Santhanakrishanan, et al., "Flow Control With Plasma Synthetic Jet Actuators," Journal of Physics D: Applied Physics, 2007, p. 637-651, vol. 40, Issue 3. (Abstract Only).

Jayaraman, et al., "Modeling of Dielectric Barrier Discharge Plasma Actuator," Journal of Applied Physics, 2008, vol. 103, Issue 5. (Abstract Only).

Hultgren, et al., "Demonstration of Separation Delay With Glow-Discharge Plasma Actuators," NASA, Dec. 2004, p. 1-15; American Institute of Aeronautics and Astronautics, Inc. (AIAA) 2003-1025.

(Continued)

*Primary Examiner* — Chandra Chaudhari
(74) *Attorney, Agent, or Firm* — Hope Baldauff Hartman, LLC

(57) ABSTRACT

Methods of utilizing plasma actuating cascade arrays for actively controlling airflow over wind turbine blades are described herein. These methods may include providing plasma actuating cascade arrays that include dielectrics and electrodes. The electrodes and dielectrics are electrically operated to generate plasma clusters, and to induce directional airflows in response to the plasma clusters. The methods may also include configuring the plasma actuating cascade arrays based, at least in part, on characteristics of the wind turbine blades and characteristics of energy generation regimes and scenarios.

24 Claims, 15 Drawing Sheets

OTHER PUBLICATIONS

Post, et al., "Separation Control Using Plasma Actuators-Dynamic Stall Control on an Oscillating Airfoil," American Institute of Aeronautics and Astronautics, Inc., (AIAA)-2004-2517; $2^{nd}$ AIAA Flow Control Conference, Jun. 28-Jul. 1, 2004, Portland, Oregon.

U.S. Appl. No. 12/273,650 entitled "Disbanded Cascaded Array for Generating and Moving Plasma Clusters for Active Airflow Control" filed Nov. 19, 2008.

U.S. Appl. No. 12/432,451 entitled "Active Directional Control of Airflows Over Rotorcraft Blades Using Plasma Actuating Cascade Arrays" filed on Apr. 29, 2009.

U.S. Official Action dated Aug. 11, 2011 in U.S. Appl. No. 12/432,451.

U.S. Official Action dated Sep. 9, 2011 in U.S. Appl. No. 12/273,650.

International Search Report and Written Opinion dated Feb. 16, 2010 in PCT/US2009/064426.

Interview Summary filed Nov. 11, 2011 in U.S. Appl. No. 12/432,451.

U.S. Notice of Allowance dated Dec. 9, 2011 in U.S. Appl. No. 12/432,451.

U.S. Notice of Allowance dated Feb. 2, 2012 in U.S. Appl. No. 12/273,650.

* cited by examiner

ACTIVE DIRECTIONAL CONTROL OF AIRFLOWS OVER WIND TURBINE BLADES USING PLASMA ACTUATING CASCADE ARRAYS

FIELD OF THE DISCLOSURE

This disclosure pertains generally to actively controlling directional airflows moving over wind turbine blades, and pertains more specifically to plasma actuating cascade arrays for actively generating and moving plasma clusters to manage these directional airflows.

BACKGROUND

In a variety of different aerodynamic scenarios, airflows occurring over wind turbine blades may become turbulent, unstable or below or above the optimal airflow speed envelope. In some cases and during some severe environmental conditions, it may reduce the efficiency and energy producing characteristics or robustness of the wind turbine blades, resulting in reduced overall aerodynamic efficiency and reliability, as well as reduced energy production.

Previous techniques have addressed this issue by providing various types of modifications of the shapes of the wind turbine blades or means of active airflow control. However, these previous approaches typically involve utilization of different materials or utilizing mechanical, electromechanical, or pneumatic systems. Modifying underlying design or retrofitting the wind turbine blades may involve significant modification of the structure underlying an airfoil. Also, these previous systems, including ones utilizing enhanced materials, may be expensive to implement, in terms of cost and labor to install or retrofit onto existing airfoils.

In addition, some previous active airflow control systems incorporate several electrodes disposed along a single given dielectric. However, such systems may not efficiently utilize the surface area of an airfoil that would otherwise be available for generating plasma. For example, if the electrodes are located too close to one another, counterforces may form between adjacent electrodes. These counterforces may result in smaller, weaker clusters of plasma, which are less effective in generating bulk airflows.

To reduce the formation of these counterforces, these previous active airflow control systems may increase the distances between the electrodes along the single dielectric. However, these increased distances between electrodes may result in fewer plasma-generating units per unit of surface area on the airfoil. This decreased concentration of plasma-generating units, in turn, may reduce the efficiency of these previous airflow control systems in influencing bulk airflows.

SUMMARY

It should be appreciated that this Summary is provided to introduce a selection of concepts in a simplified form that are further described below in the Detailed Description. This Summary is not intended to be used to limit the scope of the claimed subject matter.

According to an embodiment, methods of providing active airflow control over wind turbine blades are described herein. These methods may include providing plasma actuated cascade arrays that include dielectrics and electrodes. The electrodes and dielectrics are electrically operative to generate plasma clusters, and to induce directional airflows in response to the plasma clusters. The methods may also include configuring the plasma actuating cascade arrays based, at least in part, on characteristics of the wind turbine blades.

In another embodiment, a method is disclosed for implementing plasma actuated cascade arrays onto wind turbine blades, for actively controlling airflows over the wind turbine blades. These methods may include providing the plasma actuated cascade arrays. The plasma actuated cascade arrays include dielectrics and electrodes, with the electrodes and dielectrics are electrically operative to generate plasma clusters, thereby inducing directional airflows associated with the plasma clusters. The methods may also include installing the plasma actuating cascade arrays onto the wind turbine blades.

In another embodiment, a method is disclosed for actively controlling directional airflow passing over a wind turbine blade, using a plasma actuated cascade array installed onto the wind turbine blade. The method may include providing electrical power in the form of a custom waveform to the plasma actuated cascade array. The custom waveform may be defined to actively control airflows passing over the wind turbine blades by generating plasma clusters. The method may also include generating plasma clusters proximate the plasma actuated cascade array during a first phase of the electrical power, and moving the plasma clusters along the plasma actuated cascade array in response to a further phase of the electrical power. The method may also include generating directional airflows in response to movement of the plasma clusters.

The features, functions, and advantages discussed herein may be achieved independently in various embodiments of the present description or may be combined in yet other embodiments, further details of which can be seen with reference to the following description and drawings.

DETAILED DESCRIPTION

The following detailed description discloses various tools and techniques related to active directional control of airflows over wind turbine blades using plasma actuating cascade arrays. This description is most readily understood with reference to the attached drawings, in which like reference numbers may appear in different drawings to refer to similar elements.

For the purposes of this description, but without limiting possible implementations, the term "plasma" as used herein may refer to ionized gas or air molecules that result when the gas or air molecules pass through an electric field defined between two electrodes. Typically, the air molecules lose one or more electrons, or become split, therefore producing neutral, positively or negatively charged particles, and also releasing other free electrons.

Figure 1:
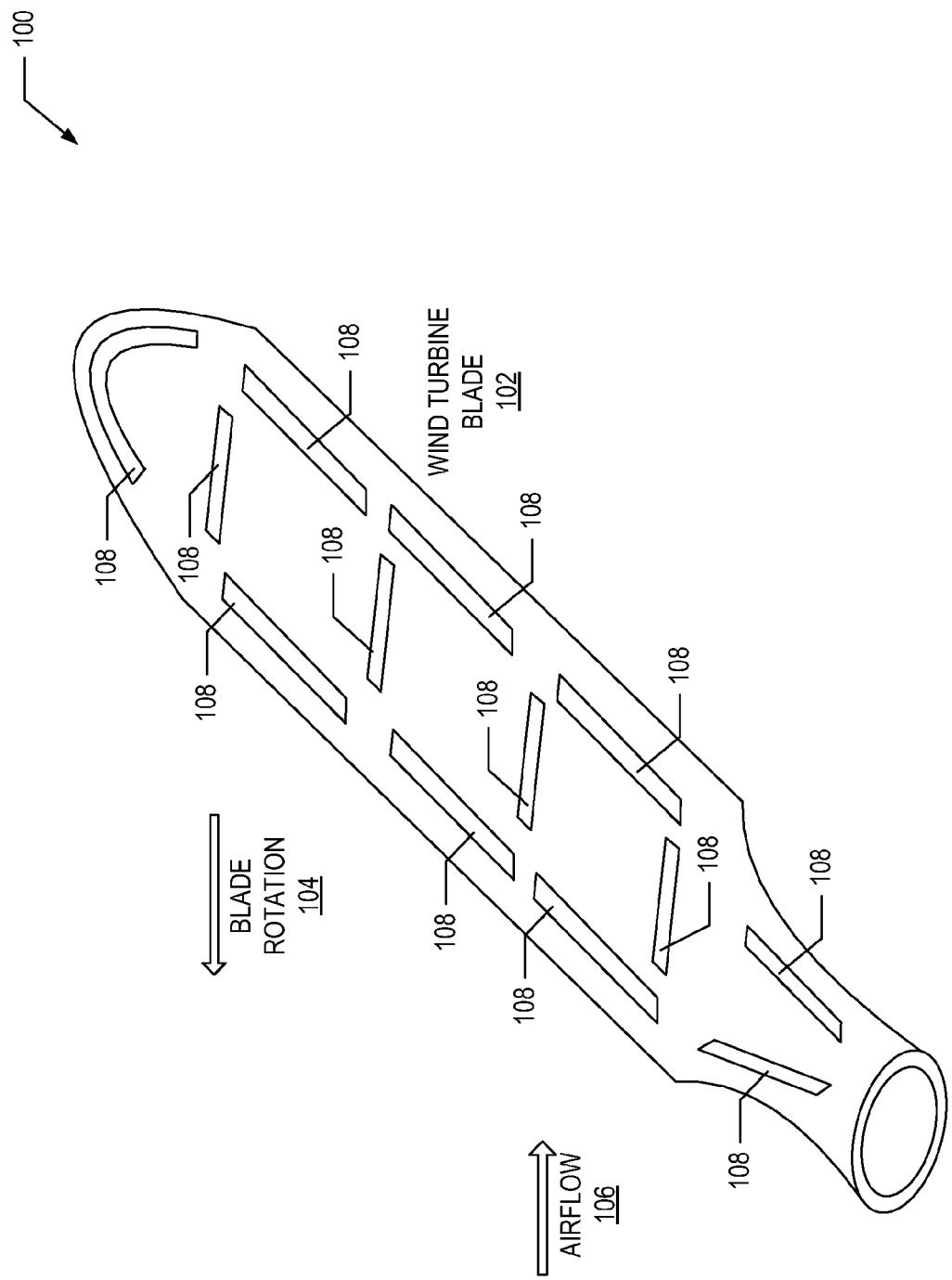
FIG. 1 is a schematic diagram illustrating systems or operating environments for performing active directional control of airflows over wind turbine blades using plasma actuating cascade arrays.

FIG. 1 illustrates systems or operating environments, denoted generally at 100, for performing active directional control of airflows over wind turbine blades using plasma actuating cascade arrays. These systems may include one or more wind turbine blades 102, with any number of the wind turbine blades 102 being rotateably attached to a suitable tower or other framework. For example, an overall wind turbine system (illustrated and described further below with FIG. 12) may include any number of the wind turbine blades 102, with the blades 102 driven by ambient wind to provide rotary mechanical energy. In turn, this rotary mechanical energy may be converted to electrical power. Accordingly, these wind turbine blades 102 may be understood as a type of rotary airfoil.

The wind turbine blades 102 as shown in FIG. 1, as well as the subsequent drawings presented herein, are shown only for example to facilitate the present description, but not to limit possible implementations of this description. In addition, the wind turbine blades 102, as well as other elements illustrated herein, are not drawn to scale, and are shown only for convenience in illustrating certain features of this description. However, implementations of this description may include wind turbine blades 102, or elements thereof, having physical proportions or visual appearances different from those shown herein. For example, the wind turbine blades 102 included in implementations of this description may have any cross-sectional profile, size, or portions, or other physical dimensions recognized as suitable for a given application.

In general, any number of the wind turbine blades 102 may rotate around a given axis (not shown in FIG. 1), with the arrow 104 generally representing an example direction in which the wind turbine blades 102 may rotate. The wind turbine blades 102 may rotate in response to an oncoming airflow 106, which may encounter and pass over any number of the blades 102. The direction and speed of the oncoming airflow 106 may vary depending upon a variety of different conditions, the rotational speed of the wind turbine blades 102 varying in response to the characteristics of the airflow 106. In some implementation scenarios, a plurality of the wind turbine blades 102 may be rotated together to better face into the oncoming airflow 106.

The wind turbine blades 102 may include any number of plasma actuating cascaded arrays 108 (hereinafter, cascaded arrays 108), with FIG. 1 illustrating an example arrangement or configuration of the cascaded arrays 108 only for clarity of illustration. However, as illustrated and described in subsequent drawings, implementations of the wind turbine blades 102 may include any number or configuration of the cascaded arrays 108. It is further noted that the location of the cascaded arrays 108 as shown in FIG. 1 is illustrative only, and that the cascaded arrays 108 may be located wherever appropriate on the surfaces of the wind turbine blades 102, according to circumstances of particular implementations of this description.

In general, the wind turbine blades 102 may include exterior surfaces that are driven to rotate by an oncoming air or gas (e.g., airflow 106). In addition, the blades 102 may experience losses or inefficiencies associated with disruption in the airflows along the blades 102. For conciseness of description, but not to limit possible implementations, this description refers to air and gas flows collectively as airflows.

In some implementations, the cascaded arrays 108 may be installed onto the surface of the wind turbine blades 102, without substantially modifying the structure underlying the wind turbine blades. Aside from receiving electrical power, the cascaded arrays 108 may have minimal structural impact on the wind turbine blades to which they are installed.

As described in further detail below, the cascaded arrays 108 may actively control and/or redirect airflows moving over the wind turbine blades 102. To describe the types of control that the cascaded arrays 108 may provide, the discussion now turns to FIG. 2.

Figure 2:
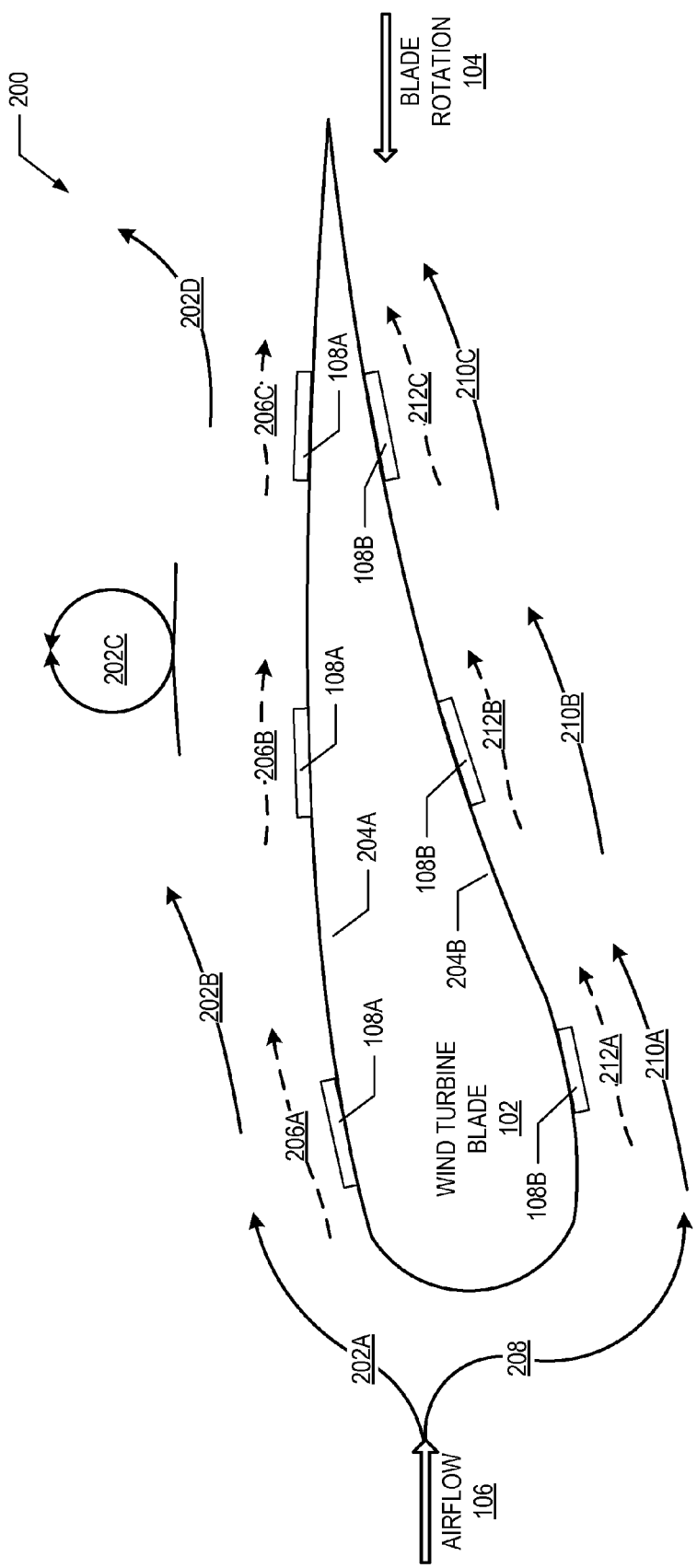
FIG. 2 is a schematic diagram illustrating techniques for modifying airflows to provide aligned airflows as these airflows pass over the wind turbine blades.

FIG. 2 illustrates techniques, denoted generally at 200, for modifying the airflows 106, as carried forward from FIG. 1, as these airflows pass over a representative wind turbine blade 102 during the blade rotation symbolized at 104. In different possible implementation scenarios, the wind turbine blades 102 may include any number of cascaded arrays 108A along one surface of the blade 102, and any number of cascaded arrays 108B along another surface of the blade 102. However, it is noted that these implementation scenarios may or may not deploy cascaded arrays 108A and/or 108B on multiple surfaces of the blades 102.

In scenarios in which the wind turbine blades 102 do not include the cascaded arrays 108, the airflows 106 may separate undesirably from the surface of the wind turbine blades 102, as represented generally by separated airflows 202A, 202B, 202C, and 202D (collectively, separated airflows 202). If the airflows 106 separate from the wind turbine blades 102 as indicated at 202A-202D, these separated airflows 202 may under certain conditions reduce the efficiency of the wind turbine blades 102, reducing the operational efficiency and power-generating capability provided by the wind turbine blades 102. In extreme cases, the wind turbine blades 102 may experience stall conditions due to undesirable airflow separation 202.

In the scenario shown in FIG. 2, the wind turbine blades 102 may be equipped with one or more of the cascaded arrays 108. These cascaded arrays 108 may be installed anywhere along the wind turbine blades 102 as appropriate, with the locations shown in FIG. 2 provided only as examples to facilitate this description.

Turning to the cascaded arrays 108 in more detail, these cascaded arrays 108 may selectively and actively modify the airflows 106 relative to the surfaces of the wind turbine blades 102. In the examples shown in FIG. 2, the cascaded arrays 108 may modify the airflows 106, bringing them closer to the surfaces 204A and/or 204B of the wind turbine blades 102. The airflows 106 as modified by operation of the cascaded arrays 108 are shown at 206A, 206B, and 206C (collectively, modified airflows 206), as compared to the separated airflows 202.

FIG. 2 illustrates the relationship between the separated airflows 202 and the modified airflows 206 somewhat arbitrarily and only for example, with the understanding that FIG. 2 is not drawn to scale. In implementations of this description, the relationship between the separated airflows 202 and the modified airflows 206 may vary from that shown in FIG. 2. However, modifying the airflows 206 to be closer to the wind turbine blades 102 may increase the stability and efficiency of the wind turbine blades 102 by altering the formation of high-pressure regions on the top surface 204A of the wind turbine blades 102. In addition, the cascaded arrays 108 may contribute to increasing the power-generating efficiency of wind turbine system to which the wind turbine blades 102 are affixed, while also reducing the prospect of a stall condition.

As shown in FIG. 2, some implementations of this description may deploy any number of the cascaded arrays 108B along the surface 204B of the wind turbine blade 102. As represented generally at 208, some portion of the oncoming airflow 106 may pass along the surface 204B. Without the cascaded arrays 108B, the portion 208 of the oncoming airflow 106 may separate from the surface 204B, as denoted generally at 210A, 210B, and 210C (collectively, separated airflows 210). However, as detailed further throughout this description, the cascaded arrays 108B may modify the airflow portion 208, bringing the airflows 208 more closely to the surface 204B, as represented at 212A, 212B, and 212C (collectively, modified airflows 212). Bringing these modified airflows closer to the surface 204B may enhance the overall aerodynamic and operational performance of the wind turbine 102.

The modified airflows 206 and 212 are referred to herein as "aligned" airflows, in the sense that the modified airflows 206 and 212 proceed in generally the same direction as the oncoming airflow 106. However, the techniques described herein may provide other implementation scenarios, in which the modified airflows proceed in the direction opposite to that of the oncoming airflow 106. These scenarios are now described and illustrated further with FIG. 3.

Figure 3:
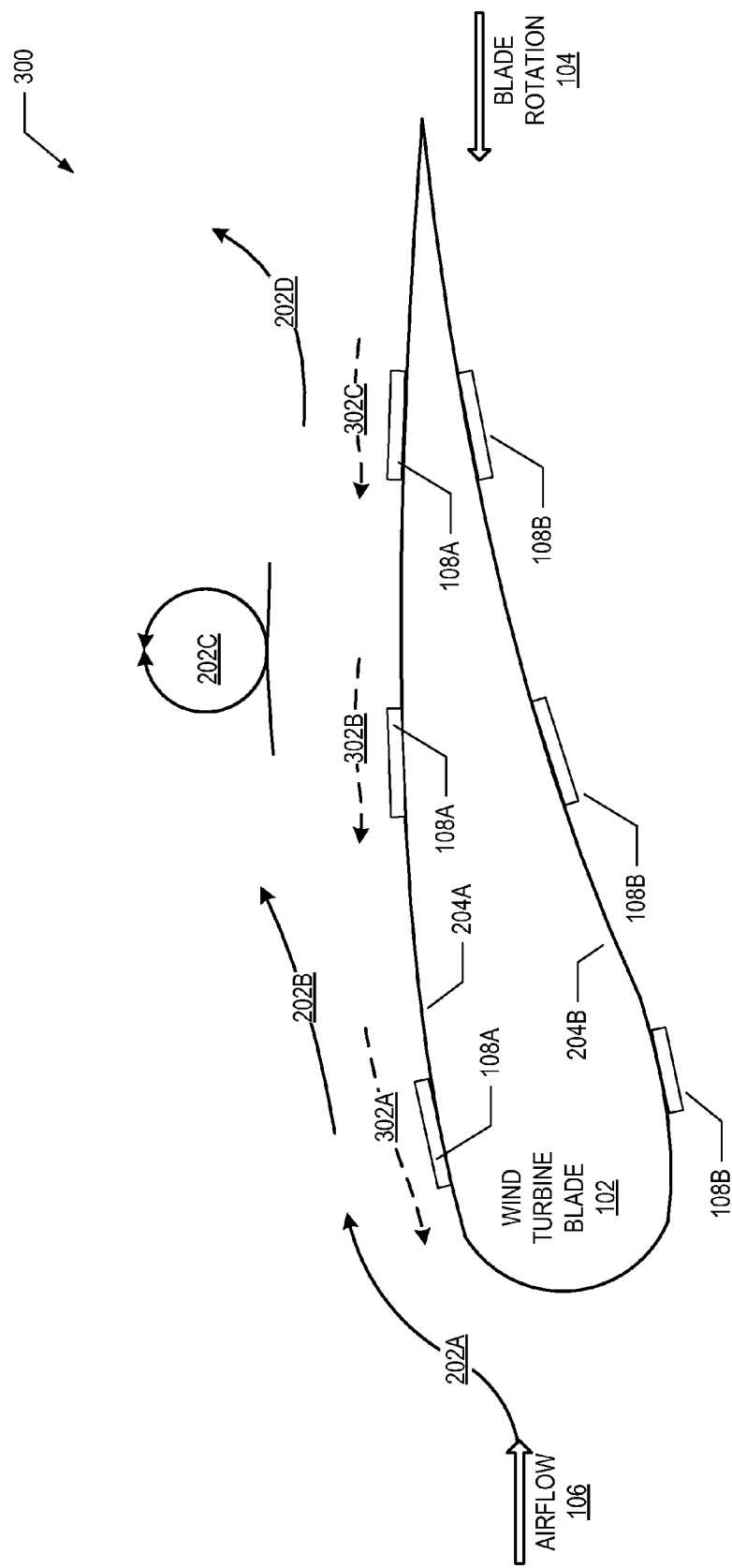
FIG. 3 is a schematic diagram illustrating additional techniques for modifying airflows to provide suppressive airflows.

FIG. 3 illustrates additional examples, denoted generally at 300, for modifying the oncoming airflows 106, as carried forward from FIG. 1, as these airflows pass over the wind turbine blades 102, resulting in the blade rotation symbolized at 104. For ease of reference, FIG. 3 includes the separated airflows 202A-202D from FIG. 2.

Referring to FIG. 3 in more detail, the wind turbine blade 102 shown in FIG. 3 may include any number of cascaded arrays 108. More specifically, FIG. 3 provides examples of operating the cascaded arrays 108A and/or 108B so as to generate modified airflows 302A, 302B, and 302C (collectively, modified airflows 302). More specifically, the modified airflows 302 may be characterized as "suppressive", in the sense that they proceed generally in a direction opposite that of the oncoming airflow 106. Although FIG. 3 provides examples in which the cascaded arrays 108A produce suppressive airflows 302 along the surface 204A, implementations are also possible in which the cascaded arrays 108B produce similar suppressive airflows along the surface 204B.

As appreciated from the foregoing description, the operation of the cascaded arrays 108A and/or 108B may be controlled or modulated, to produce selectively the modified airflows 206, 212, and/or 302. In turn, the speed and direction of the modified airflows 206, 212, and/or 302 may vary in response to operation of the cascaded arrays 108A and/or 108B. In implementations that provide the foregoing functions, operation of the cascaded arrays 108A and 108B may be coordinated with one another, to coordinate generation and movement of the modified airflows 206, 212, and/or 302. More specifically, the control circuits described in more detail below may operate in response to customized waveforms that achieve the foregoing coordination.

In different possible scenarios, respective airflows passing along the surfaces 204A and 204B may be controlled separately. For example, in low-wind scenarios, airflows along the surface 204B may be suppressed and airflows along the surface 204A may be accelerated, resulting in the airflow along the surface 204B exerting a greater pressure on the blade 102 as compared to the rusher exerted by the airflow along the surface 204A. This increased pressure gradient may help to overcome the inertia of the blade 102, resulting in increased power production during low-wind conditions. Conversely, in high-wind conditions, suppressive airflows along the surface 204A and/or 204B may help to decelerate the wind turbine blade 102.

Having illustrated and described how the cascaded arrays 108A and/or 108B may selectively modify the airflows 206, 212, and/or 302 along the wind turbine blades 102, the discussion now turns to a more detailed description of the cascaded arrays 108A and/or 108B. This description now proceeds with FIG. 4.

Figure 4:
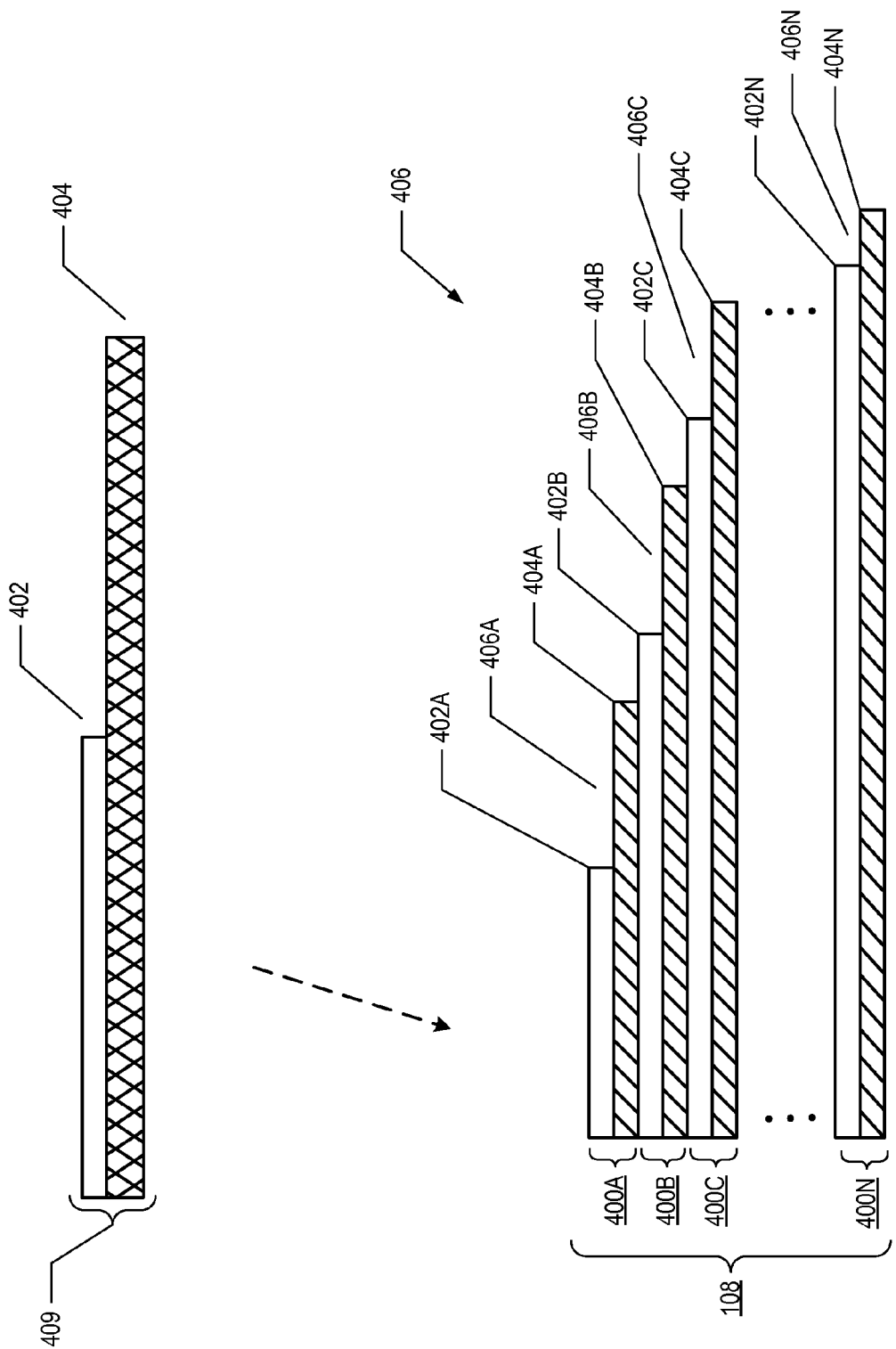
FIG. 4 is a diagram that illustrates electrodes and dielectrics that may form plasma actuating cascade arrays.

FIG. 4 illustrates a plasma generation unit, denoted generally at 400, which may be stacked in a form of a cascade array to generate and move plasma clusters. In turn, any number of the plasma clusters may produce the modified airflows 206, 212, and/or 302 as shown generally in FIGS. 2-3. The cascaded arrays 108 as shown in the previous Figures may include any number of these plasma generation units 400.

Turning to the plasma generation units 400 in more detail, these units may include any number of electrodes 402 and any number of dielectrics 404. In the examples shown in FIG. 4, individual electrodes 402 and dielectrics 404 may be elongated to any convenient length, and may be constructed to have any suitable thickness.

FIG. 4 also illustrates constructions, denoted generally at 406, that may include any number of the plasma generation units 400A-400N (collectively, plasma generation units 400), with a given cascaded array 108 including any number of the plasma generation units 400. As shown in FIG. 4, the plasma generation unit 400A may include the electrode 402A and the dielectric 404A. Likewise, the plasma generation unit 400B may include the electrode 402B and the dielectric 404B, the plasma generation unit 400C may include the electrode 402C and the dielectric 404C, and the plasma generation unit 400N may include the electrode 402N and the dielectric 404N. While FIG. 4 illustrates four examples of the units 400A-400N, it is noted that implementations of this description may include any number of the units 400.

Turning to FIG. 4 in more detail, the cascaded array 108 may be constructed so that the dielectric 404A is sandwiched between the electrodes 402A and 402B, the dielectric 404B is sandwiched between the electrodes 402B and 402C, and so on. In the examples shown in FIG. 4, the dielectric 404A is slightly longer than the electrode 402A, the electrode 402B is slightly longer than the dielectric 404A, and so on.

As shown and discussed further below, the cascaded arrays 108 may also be constructed to have an angled, curved, bent, or non-planar configuration. In these latter configurations, the electrodes and dielectrics may be staggered relative to one another, resulting in a generally stair-stepped arrangement. In this arrangement, a given electrode may extend somewhat beyond the dielectric immediately above it in the array, the dialectic immediately below the given electrode may extend beyond the electrode, and so on.

In the configuration shown in FIG. 4, the cascaded array 108 may define a plurality of areas 406A, 406B, 406C, and 406N (collectively, areas or 406) suitable for generating plasma clusters. These plasma clusters are illustrated and described in more detail below. However, for the purposes of describing FIG. 4, the area 406A may be generally defined by how much the dielectric 404A and the electrode 402B extend past the end of the electrode 402A. Similarly, the area 406B may be defined generally by how much the dielectric 404B and the electrode 402C extend past the end of the electrode 402B, and the area 406C may be defined by how much the dielectric 404C and a next electrode (not shown) extend past the electrode 402C. Finally, the area 406N may be defined by how much a dielectric 404N extends past the electrode 402N. It is appreciated from this description of FIG. 4 that the construction of the array 108 may be extended to any level of cascade.

Figure 5:
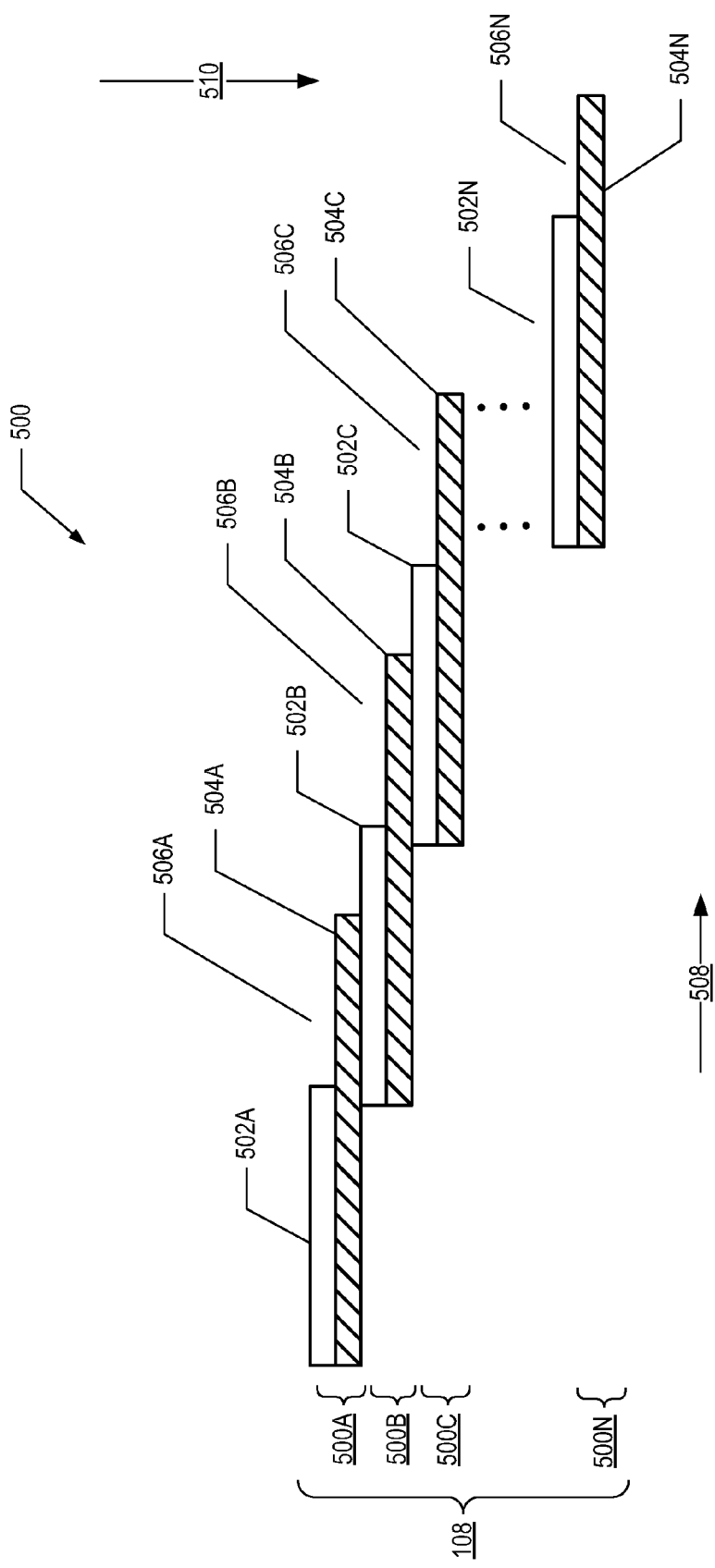
FIG. 5 is a diagram illustrating additional constructions of the plasma actuating cascade arrays, in which the dielectrics are generally the same length.

FIG. 5 illustrates additional constructions, denoted generally at 500, of the cascaded array 108. More specifically, the cascaded array 108 may include any number of units 500A-500N, which in turn may include respective pairs of electrodes 502A-502N and dielectrics 504A-504N that are cascaded into arrays for generating and moving plasma. The dielectrics 504A, 504B, 504C, and 504N may also be shortened, as well as the electrodes 502B, 502C, and 502N. These shortened electrodes and dielectrics may increase the physical flexibility of the overall cascaded array 108.

Figure 6:
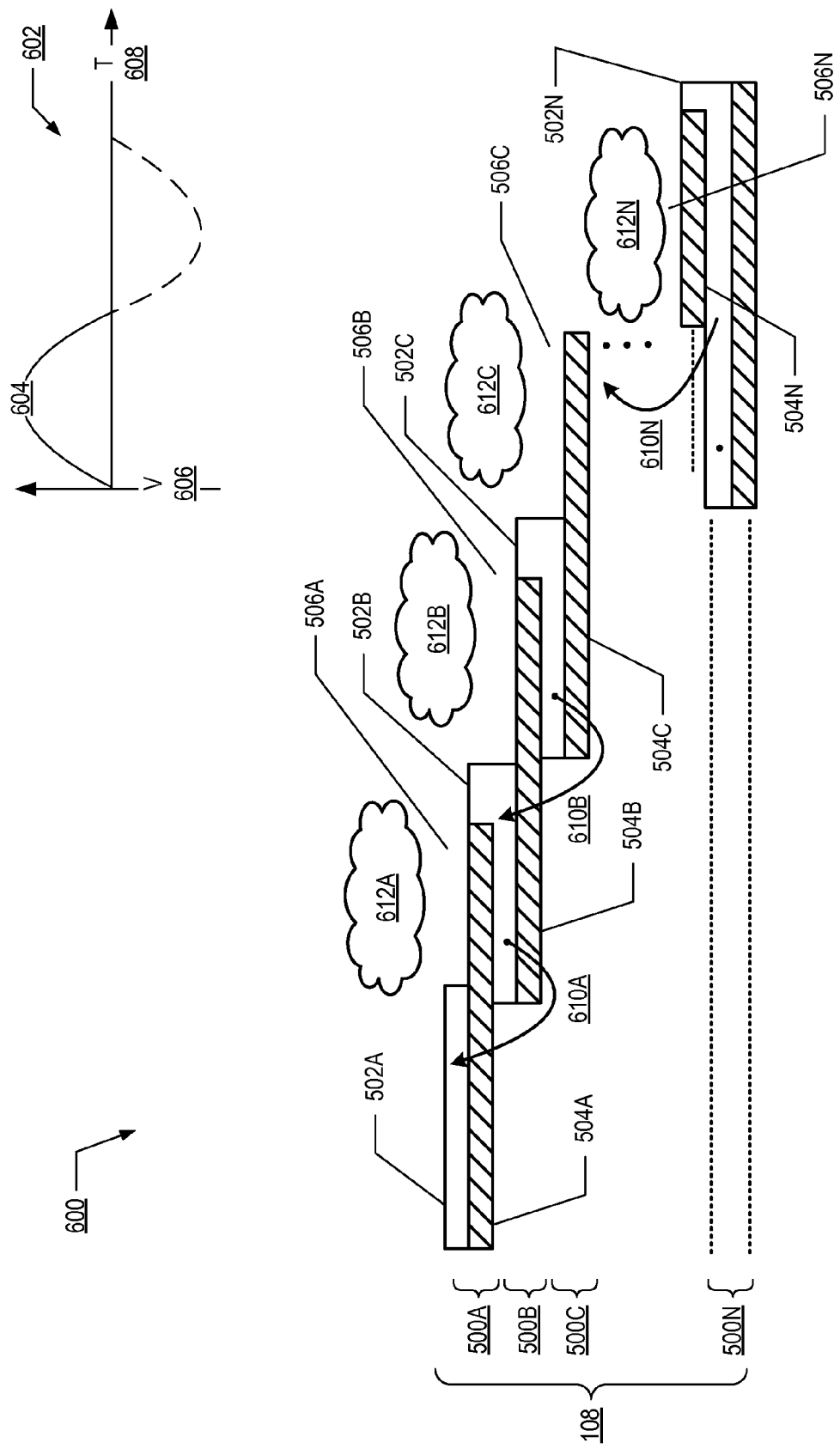
FIG. 6 is a diagram illustrating scenarios in which a given plasma actuating cascaded array may generate plasma clusters at different areas along the array.

Comparing the cascaded arrays 108 as shown in FIGS. 5 and 6, the dielectrics 504 as shown in FIG. 5 are approximately the same lengths. However, the dielectrics 404 as shown in FIG. 4 are various different lengths, depending on where they are located within the cascaded array 108. Referring to both FIGS. 4 and 5, the cascaded arrays 108 may be disbanded or cascaded in a first direction (e.g., horizontally, as represented by the arrow 508), and may be disbanded or cascaded in another direction (e.g., vertically, as represented by the arrow 510). The cascading in the direction represented by the arrow 508 may depend on how much different units 500A-500N are staggered relative to one another. The cascading in the direction represented by the arrow 510 may depend on the thicknesses of the electrodes 502 and the dielectrics 504.

FIG. 6 illustrates scenarios, denoted generally at 600, by which a given cascaded array 108 may operate the different units 500A-500N to generate plasma clusters at the different areas 506A-506N. More specifically, the cascaded array 108 may operate in response to an input waveform, denoted generally at 602. Referring to the input waveform 602, input power 604 (expressed without limitation as input voltage) may have shape, amplitude and/or polarity 606 that varies over time 608. Put differently, the input power 604 may alternate periodically over time.

As detailed further below, the various electrodes 502A-502N may be coupled to receive the input voltage 604. However, the details of these connections are omitted from FIG. 6 for convenience of description and clarity of illustration. Turning to FIG. 6 in more detail, the electrodes 502A and 502B may define a voltage 610A relative to one another, across the dielectric 504A. In response to a first phase (or half) of a cycle of this voltage, gas or air proximate the area 506A may ionize to form a plasma cluster 612A.

In a similar manner, the electrodes 502B and 502C may define a voltage 610B across the dielectric 504B, causing generation of the plasma cluster 612B. Likewise, the electrodes 502N and the previous electrode 502(N−1) (not shown) may define a voltage 610N across the dielectric 504N, causing generation of the plasma cluster 612N.

The electrodes 502B, 502C, and 502N may be L-shaped in configuration, with a thicker portion arranged as shown in FIG. 6. The thicker portions of the electrodes 502B, 502C, and 502N may place a portion of the electrodes generally flush with the dielectrics immediately above the electrodes. This configuration may promote the generation of the plasma clusters 612 in the areas 506A-506N.

Figure 7:
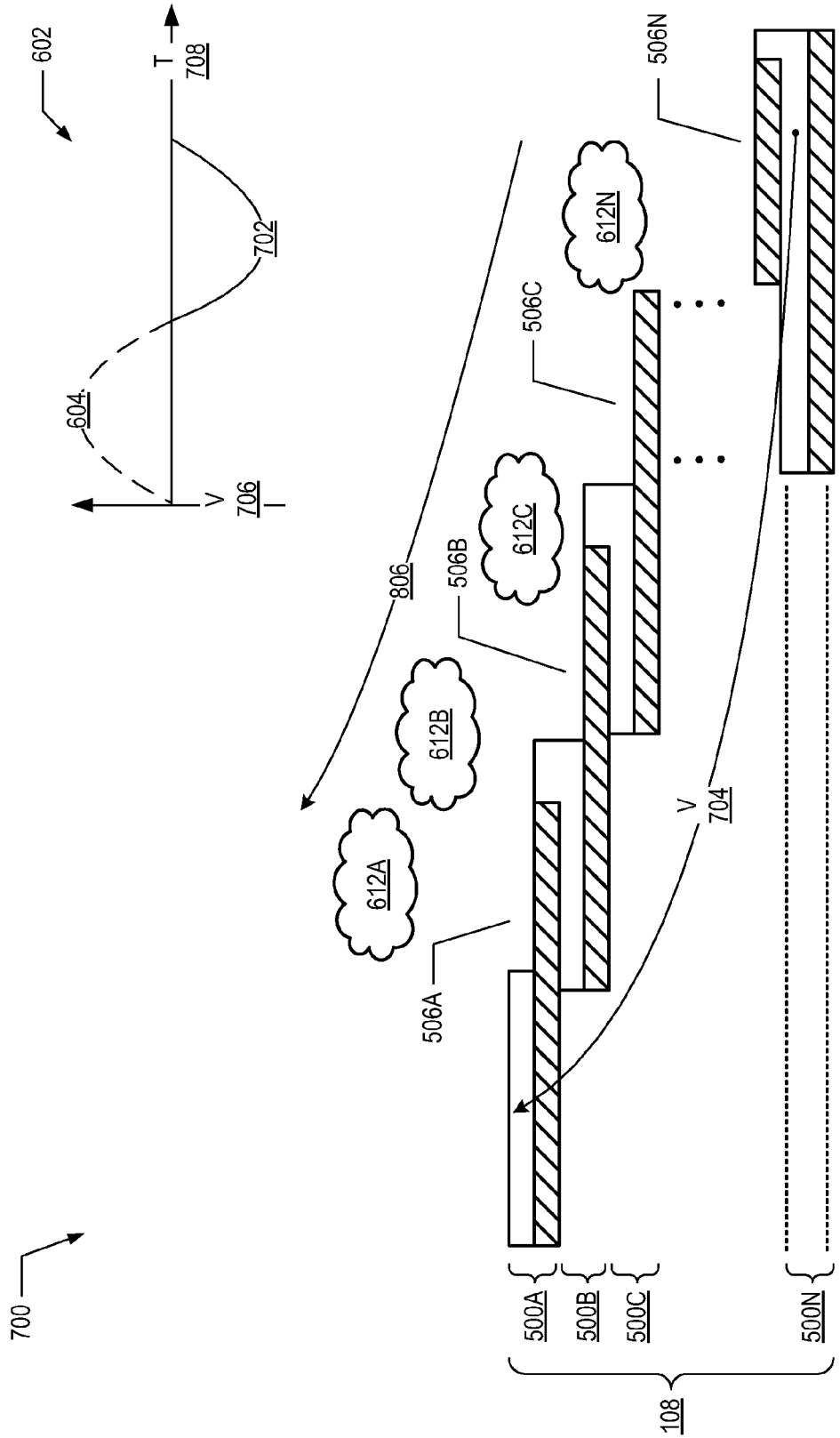
FIG. 7 is a diagram illustrating scenarios in which the plasma clusters are moved in response to an input waveform.

FIG. 7 illustrates scenarios, denoted generally at 700, by which the plasma clusters 612A-612N that were generated in FIG. 6 are moved in response to an alternative phase 702 of a cycle of the input waveform 602. For example, assuming an input waveform 602 that represents an alternating-current (AC) power source, the scenario shown in FIG. 6 may occur during one phase 604 of the AC power source, while the scenario shown in FIG. 7 may occur during a subsequent phase 702 of the power source.

It is noted that the examples of the input waveforms 602 are provided only for ease of illustration, but not to limit possible implementations. More specifically, it is noted that the input waveforms may take other forms, without departing from the scope and spirit of this description. Examples of such other forms may include, but are not limited to: saw-toothed waveforms, triangular waveforms, waveforms having non-uniform or non-standard duty cycles, and other waveforms not specifically illustrated herein. In general, different waveforms may be chosen or customized as suitable for the circumstances of particular implementation scenarios, so as to achieve particular predefined plasma generating and displacement effects.

FIG. 7 carries forward the example cascaded array 108, which may include the units 500A-500N for generating the plasma clusters 612A-612N in the vicinity of the respective areas 506A-506N. Taken as a whole, the units 500A-500N may be subjected to a cumulative voltage 704 during the second phase 702 of the input waveform 602, which was shown in FIG. 6. As the input waveform 602 enters the phase 702, the voltage applied to the units 500A-500N may cause the plasma clusters to transition. Similarly, the same effect may qualitatively be achieved by applying the phase 702 between the adjusted pairs of electrodes 502A and 502B, generating voltage 610A (FIG. 6) of the opposite polarity; between the adjusted pairs 502B and 502C, generating voltage 610B (FIG. 6) of the opposite polarity, and so on. Likewise, the phase 702 may be applied between the electrodes 504N and 504(N−1) (not shown) generating voltage 610N (FIG. 6) of the opposite polarity. These reverse steps may be done simultaneously or subsequently.

Assuming that the cascaded array 108 is installed on the surface of an airfoil (e.g., the wind turbine blades 102), the movement of the plasma clusters 612A-612N may either selectively or collectively induce air bulk movements along the surface of the airfoil, in the direction indicated by the arrow 706. In this manner, the voltage transitions occurring through the units 500 may induce air movements along the airfoil, thereby modifying airflows along the wind turbine blades 102 (e.g., modified airflows 206, 212, and/or 302 in FIGS. 2 and 3).

Generalizing from the examples shown in FIGS. 6 and 7, the waveform 602 as applied to the units 500 in the cascaded array 108 may be adjusted, so as to induce modify airflows in one or more directions by generating and moving plasma clusters as appropriate. In general, the different units 500 may be controlled individually, to induce movement of the plasma clusters generated at the different units. In addition, the different units 500 may be operated to modify airflows to move at specified speeds or velocities.

Figure 8:
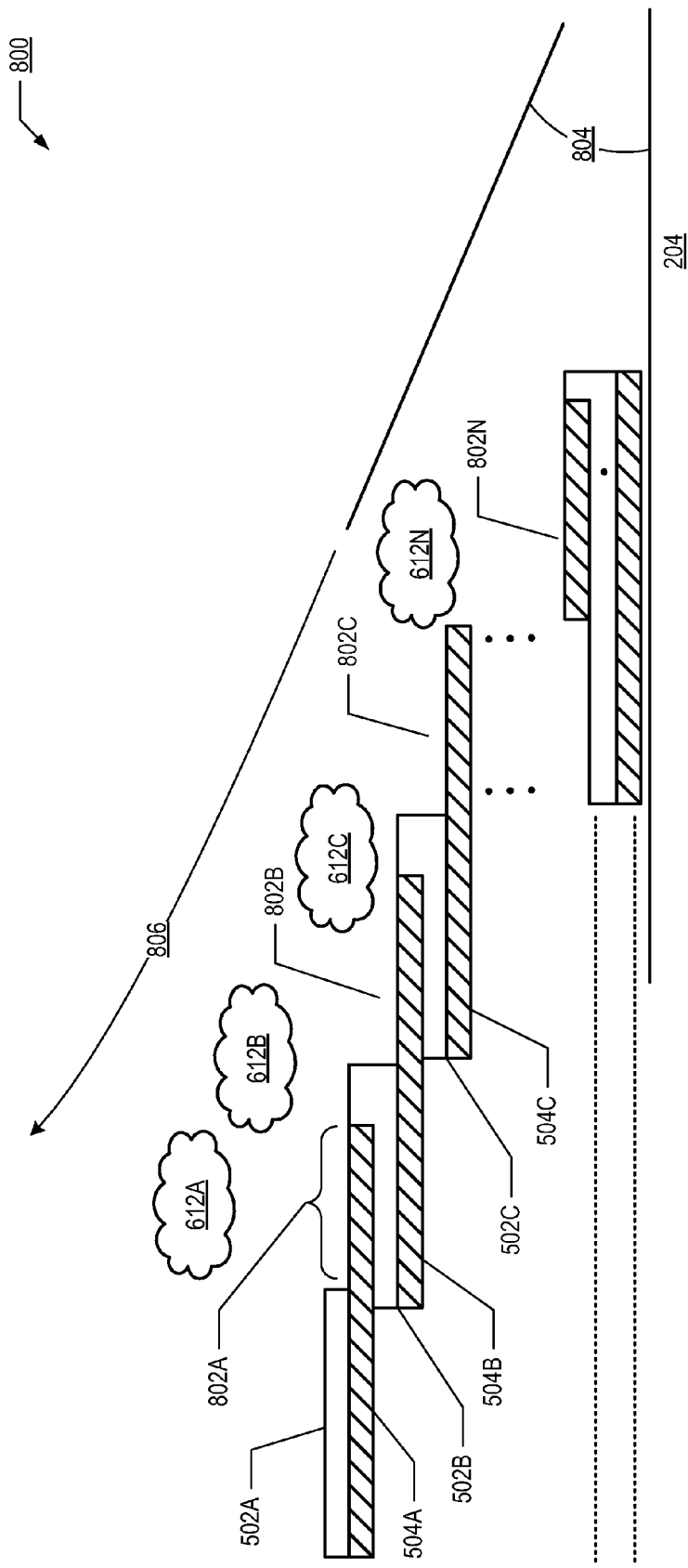
FIGS. 8 and 9 are diagrams illustrating angled configurations of the plasma actuating cascade arrays.

FIG. 8 illustrates angled configurations, denoted generally at 800, of the cascaded arrays 108. As shown in FIG. 8, a portion 802A of the dielectric 504A may be exposed between the electrodes 502A and 502B. Likewise, a portion 802B of the dielectric 504B may be exposed between the electrodes 502B and 502C, and so on through the cascaded arrays 108. In the examples shown in FIG. 8, the lengths of these exposed portions 802A, 802B, 802C, and 802N (collectively, exposed portions 802) may be approximately equal throughout the entirety of a given cascaded array 108.

The configurations 800 shown in FIG. 8 may result in the cascaded arrays 108 having an overall angled profile, as represented generally at 804. In general, the configurations 800 may be angled, relative to a surface of a wind turbine blade (e.g., 204, carried forward from FIG. 2). Accordingly, the plasma clusters 612A-612N may induce air movement 806 generally along the angled profile 804.

Figure 9:
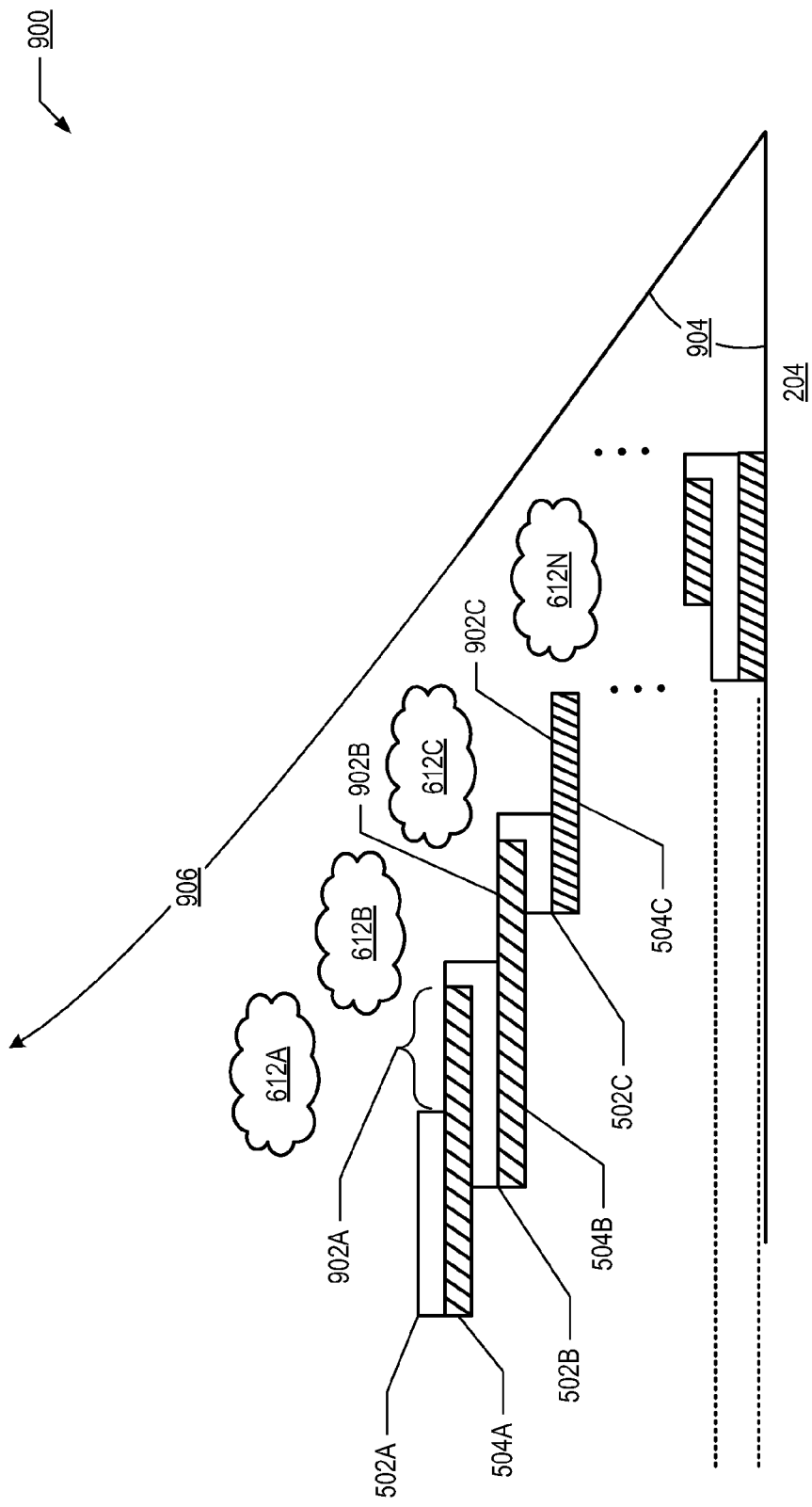

FIG. 9 illustrates additional examples of angled configurations, denoted generally at 900, of the cascaded arrays 108. As shown in FIG. 9, a portion 902A of the dielectric 504A may be exposed between the electrodes 502A and 502B. Likewise, a portion 902B of the dielectric 504B may be exposed between the electrodes 502B and 502C, and so on through the cascaded arrays 108. In the examples shown in FIG. 9, the lengths of these exposed portions 902A, 902B, 902C, and 902N (collectively, exposed portions 902) may be approximately equal throughout the entirety of a given cascaded array 108.

Although FIGS. 8 and 9 are not drawn to scale, FIG. 9 illustrates scenarios in which the exposed portions 902 are shorter than the corresponding exposed portions 802 shown in FIG. 8. When the dielectrics and electrodes are assembled as shown in FIG. 9, the angled configurations 900 as a whole may have an angled profile, as represented at 904, relative to the surface 204. However, because of the shorter lengths of the exposed dielectric portions 902, the angled profile 904 may be greater than the angled profile 804 shown in FIG. 8. Accordingly, the plasma clusters 612A-612N may induce air movements 906 along the steeper angled profile 904, as compared to the angled profile 804 shown in FIG. 8.

Having described the configurations shown in FIGS. 1-9, any number of the configurations denoted at 800 and/or 900 (or other configurations) may be installed anywhere along the surfaces 204 of the wind turbine blades 102. More specifically, the configurations 800 and/or 900 may be located on the surfaces 204 to control airflows along these surfaces. The configurations 800 and/or 900 may control these airflows to achieve any number of efficiency goals for a given wind turbine, with these goals including, but not limited to, overcoming inertia, reducing drag forces experienced by the wind turbine blades, increasing stability and power-production characteristics of the wind turbine, reducing vibration and noise effects, and the like.

Figure 10:
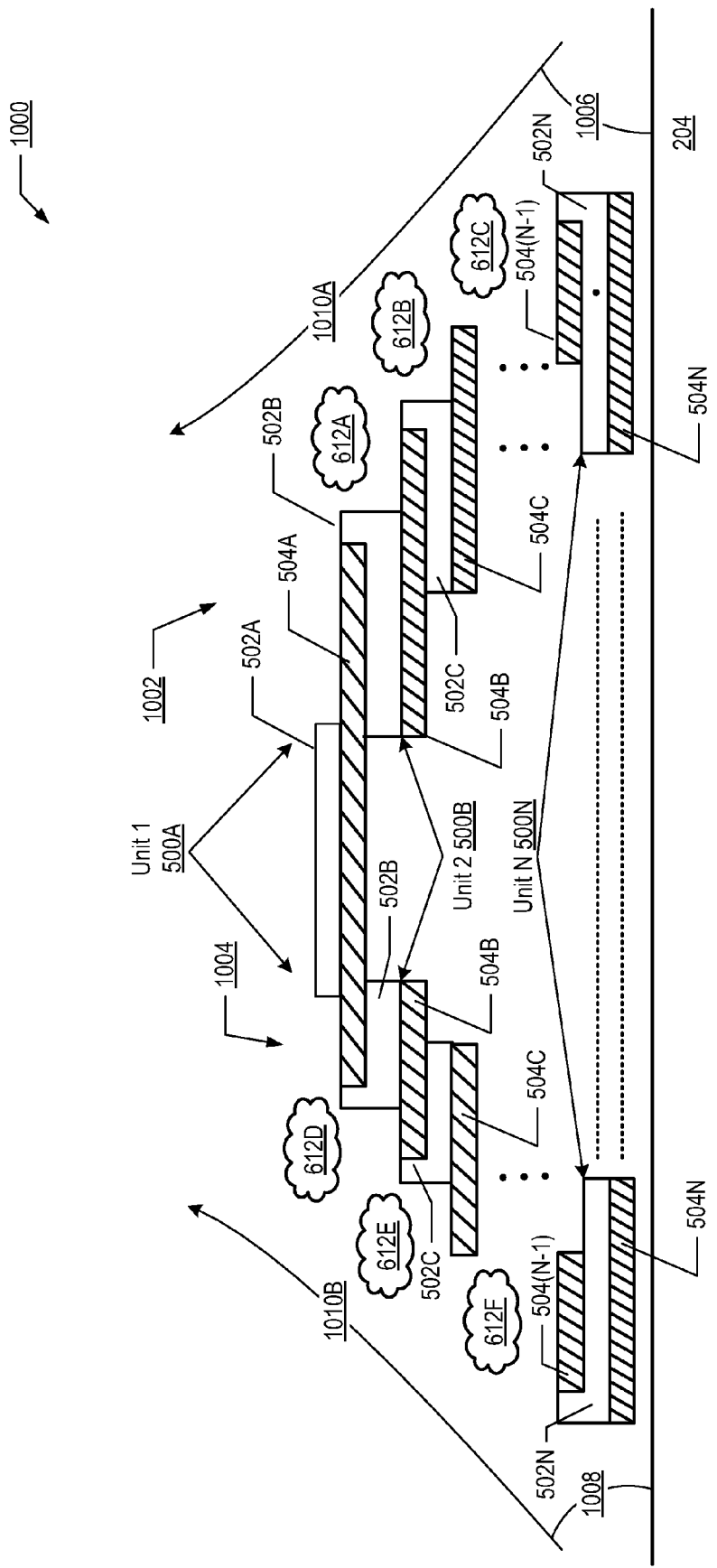
FIG. 10 is a diagram illustrating further angled configurations of the plasma actuating cascade arrays.

FIG. 10 illustrates further angled configurations, denoted generally at 1000, of the plasma actuating cascade arrays. The angled configurations 1000 may include any number of plasma generating units, carried forward at 500A, 500B, and 500N (collectively, plasma generating units 500). The plasma generating unit 500A may include the dielectric 504A, as located between the electrodes 502A and 502B. The plasma generating unit 500B may include the dielectrics 504B, as located between the electrodes 502B and 502C. The plasma generating unit 500N may include the dielectrics 504N, as located between the electrodes 502N and another set of electrodes (not shown).

Referring to the angled configurations 1000 as a whole, these configurations 1000 may generate and move any number of plasma clusters 612A, 612B, and 612C along one side 1002 of the configuration 1000, and may generate and move plasma clusters 612D, 612E, and 612F along another side 1004 of the configuration 1000. The plasma generating units 500 may be constructed so that the side 1002 has an angular configuration, denoted generally at 1006, relative to the surface 204. In addition, the side 1004 may have an angular configuration, denoted generally at 1008, relative to the surface 204.

In different possible implementations, the angular configuration 1006 may or may not be equal to the angular configuration 1008. More specifically, the angular configurations 1006 and 1008 may be varied by different mechanisms, including but not limited to: dividing equal or non-equal numbers of plasma generating units 500 in the different sides 1002 and 1004, the number of the plasma generating units energized in the different sides 1002 and 1004, the timing which the plasma generation units are energized on the different sides, the amplitude of the energizing pulse, and the like.

In operation, the different sides 1002 and 1004 may produce respective airflows 1010A and 1010B (collectively, airflows 1010). The directions shown for these airflows 1010 may vary from those shown in FIG. 10, with these examples shown only for illustration. For example, the airflow 1010A may flow as shown at an angle $\alpha$, represented by the angled configuration 1006, relative to the surface 204. The airflow 1010B may flow as shown at an angle $\beta$, represented by the angled configuration 1008, relative to the surface 204. The airflows 1010A and 1010B may combine to form a resulting generalized airflow (not shown) having an angle $\gamma$ relative to the surface 204, with the angle $\gamma$ proportional to $\beta-\alpha$.

In implementations of this description, the angle $\gamma$ may be varied using any of the techniques described herein. In addition, the angle $\gamma$ may be varied between 0° and $(180°-\beta-\alpha)$, to selectively enhance airflow along the surface 204 (i.e., aligned airflows) or to suppress airflow along the surface 204 (i.e., suppressive airflows).

In general, when directions along the surface 204 may vary as the wind turbine blade rotates. Accordingly, the direction and/or magnitude of the resulting airflow may be varied as described below as the wind turbine blade rotates in response to an oncoming airflow.

Figure 11:
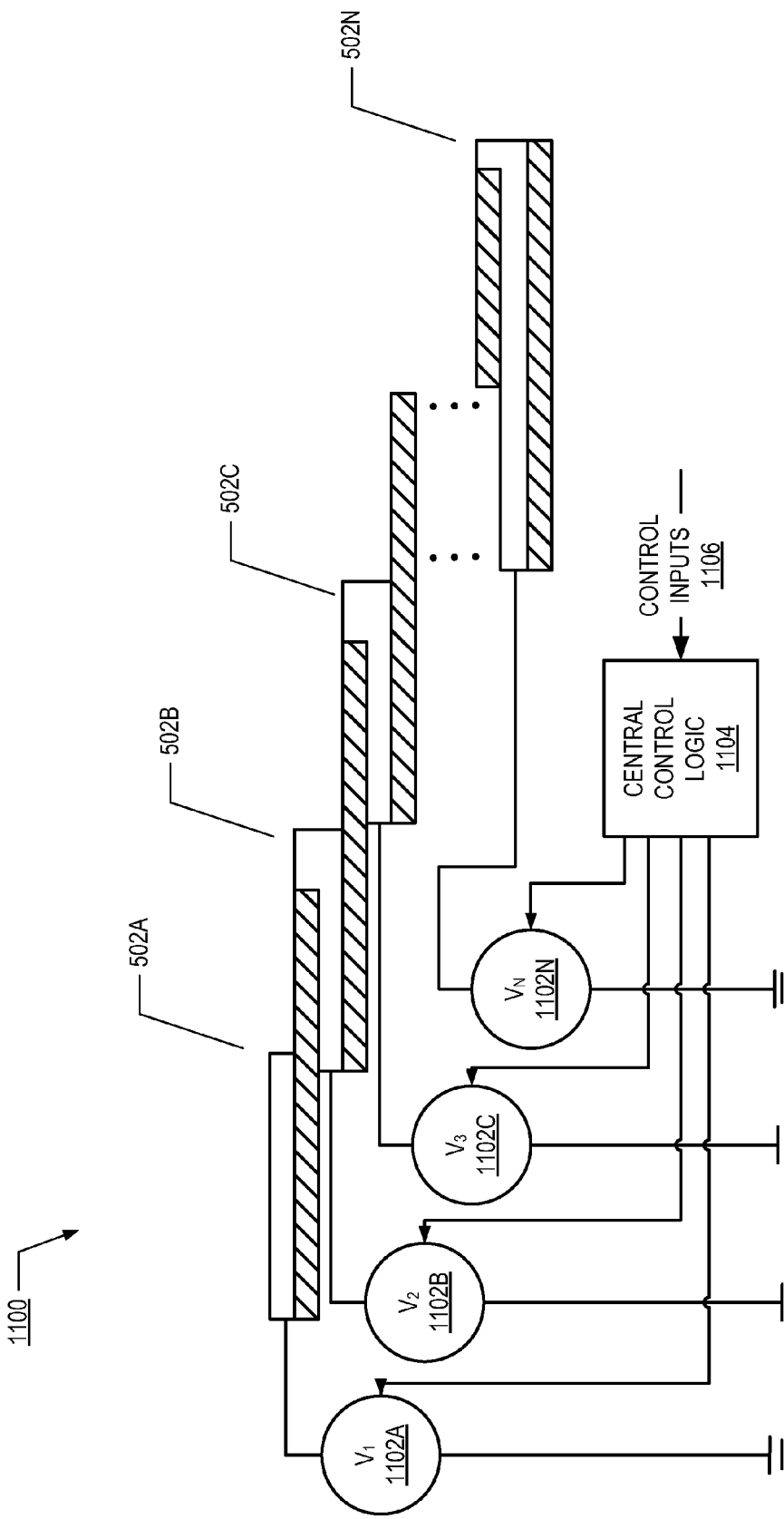
FIG. 11 is a block diagram illustrating examples of power supply systems for supplying voltage to the electrodes within the cascade arrays.

FIG. 11 illustrates examples of power supply systems, denoted generally at 1100, for supplying voltage to the electrodes 502A-502N within the cascaded array. In the scenario shown in FIG. 11, the individual electrodes 502A-502N are associated with respective discrete or individual power supplies 1102A-1102N (collectively, individual power supplies 1102). These individual power supplies 1102 may operate to generate waveforms (e.g., 702 shown in FIGS. 7 and 8), and provide them as input to the respective electrodes 502A-502N. As such, these individual power supplies 1102 may provide AC custom waveforms to the electrodes 502A-502N.

In some implementations, the different power supplies 1102A-1102N may represent individual, separately-controllable power supplies. In other implementations, the different power supplies 1102A-1102N may represent controllable portions of a single, integrated general power source.

The power supply systems 1100 may include central control logic 1104 that individually manages the operation of the power supplies 1102A-1102N, in response to signals represented by the control inputs 1106. Non-limiting examples of the control inputs 1106 are now described in further detail with FIG. 12.

Figure 12:
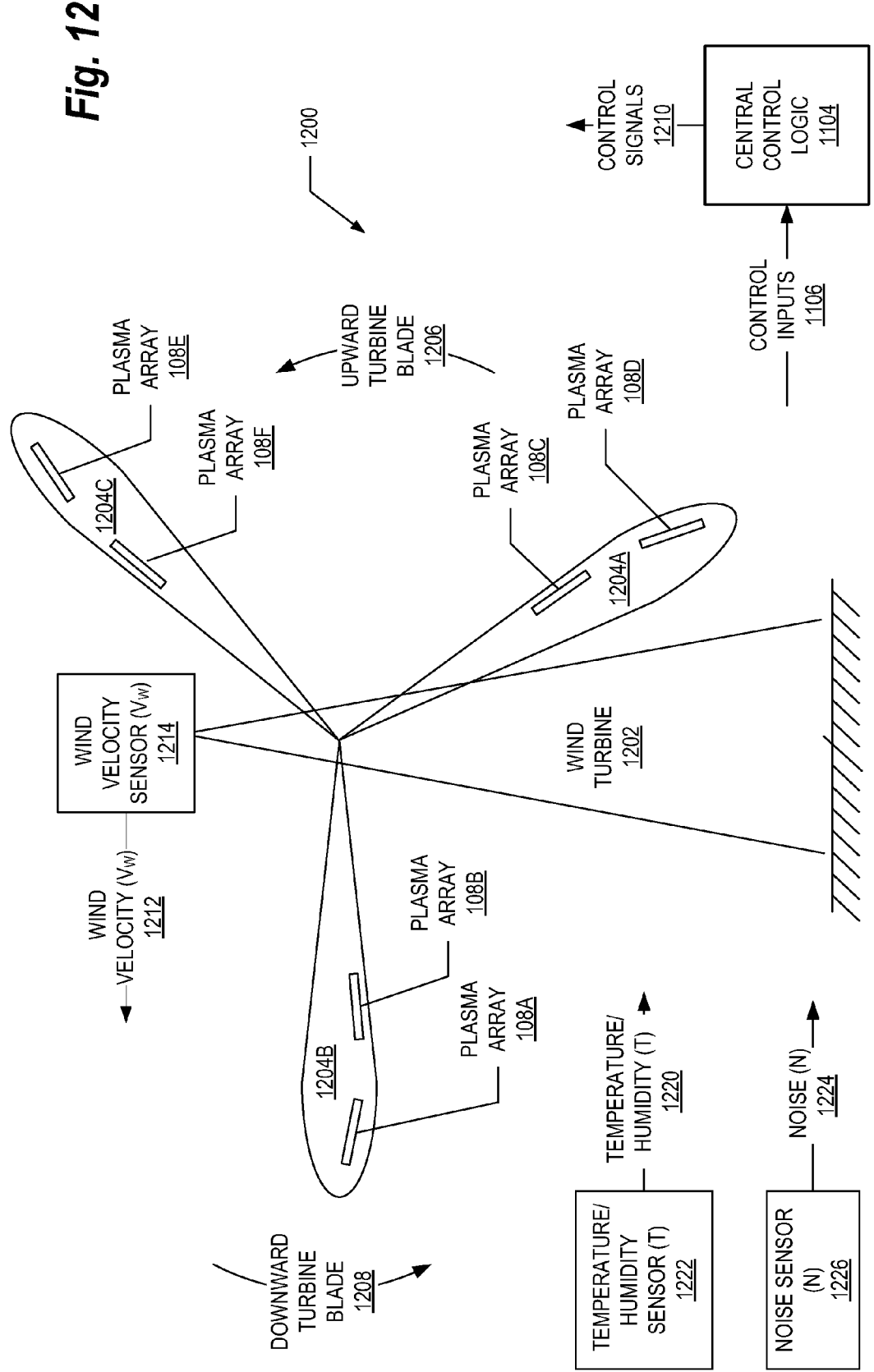
FIG. 12 is a block diagram illustrating various operating parameters, shown in schematic form to facilitate this description, that the power supply systems may receive as inputs.

FIG. 12 illustrates various operating parameters, denoted generally at 1200, shown in schematic form to facilitate this description. An illustrative wind turbine 1202 may include rotating blades 1204A, 1204B, and 1204C (collectively, rotating blades 1204), although implementations of this description may include any number of rotating blades 1204.

In the examples shown in FIG. 12, the blades 1204 may rotate in a counter-clockwise direction. In these examples, the wind turbine blade 1204A may be characterized as traveling upwards, relative to the ground, as represented generally at 1206. The wind turbine blade 1204B may be characterized as traveling downwards, relative to the ground, as represented generally at 1208. As appreciated, however, the wind turbine blades 1204 may rotate in any suitable direction and at any suitable speed, relative to the wind turbine 1202.

Generalizing the foregoing examples, in a scenario in which the blades 1204 are attached to the wind turbine 1202, one or more of the blades 1204 may be generally moving upward at a given time, relative to the ground. At that same given time, one or more of the blades 1204 may be moving downward. Depending on whether a given blade 1204 is moving upward or downward, as well as on other factors described herein, the given blade 1204 may experience different wind loads. More generally, when the wind turbine 1202 is operating, the wind turbine blade 1204A and the wind turbine blade 1204B may experience different mechanical loads, including but not limited to different wind loads, vibration, drag forces, noise producing effects, and ice-formation conditions.

FIG. 12 carries forward representative plasma arrays 108A-108E (collectively, plasma arrays 108) from previous Figures, installed on the rotating blades 1204A, 1204B, and 1204C. The number, orientation, and locations of the plasma arrays 108 as shown in FIG. 12 are illustrative only, and may vary in different implementations.

As described previously, the plasma arrays 108A-108F may be driven with customized waveforms (e.g., 602 in FIGS. 6 and 7). When the wind turbine 1202 is operating, the wind turbine blades 1204A, 1204B, and 1204C may be loaded differently. Therefore, the representative plasma arrays 108C and 108D on the wind turbine blade 1204A may be driven with waveforms that are customized in view of the load profiles experienced by that wind turbine blade during a given phase of rotation (e.g., moving upwards). In addition, the representative plasma arrays 108A and 108B on the wind turbine blade 1204B may be driven with waveforms that are customized in view of the load profiles experienced by that wind turbine blade during another phase of rotation (e.g., moving downwards). In these scenarios, the waveforms driving the plasma arrays 108A and 108B may differ from the waveforms driving the plasma arrays 108C and 108D. Similar considerations apply to the plasma arrays 108E and 108F on the blade 1204C.

The plasma arrays 108 may be driven by central control logic 1104, carried forward from FIG. 11. The central control logic 1104 may receive a set of input signals, represented generally by the control inputs 1106, which are also carried forward from FIG. 11. FIG. 12 provides examples of control signals 1210, which are output from the central control logic 1104 and drive the customized electrical waveforms to the various plasma arrays 108A-108F.

Figure 13:
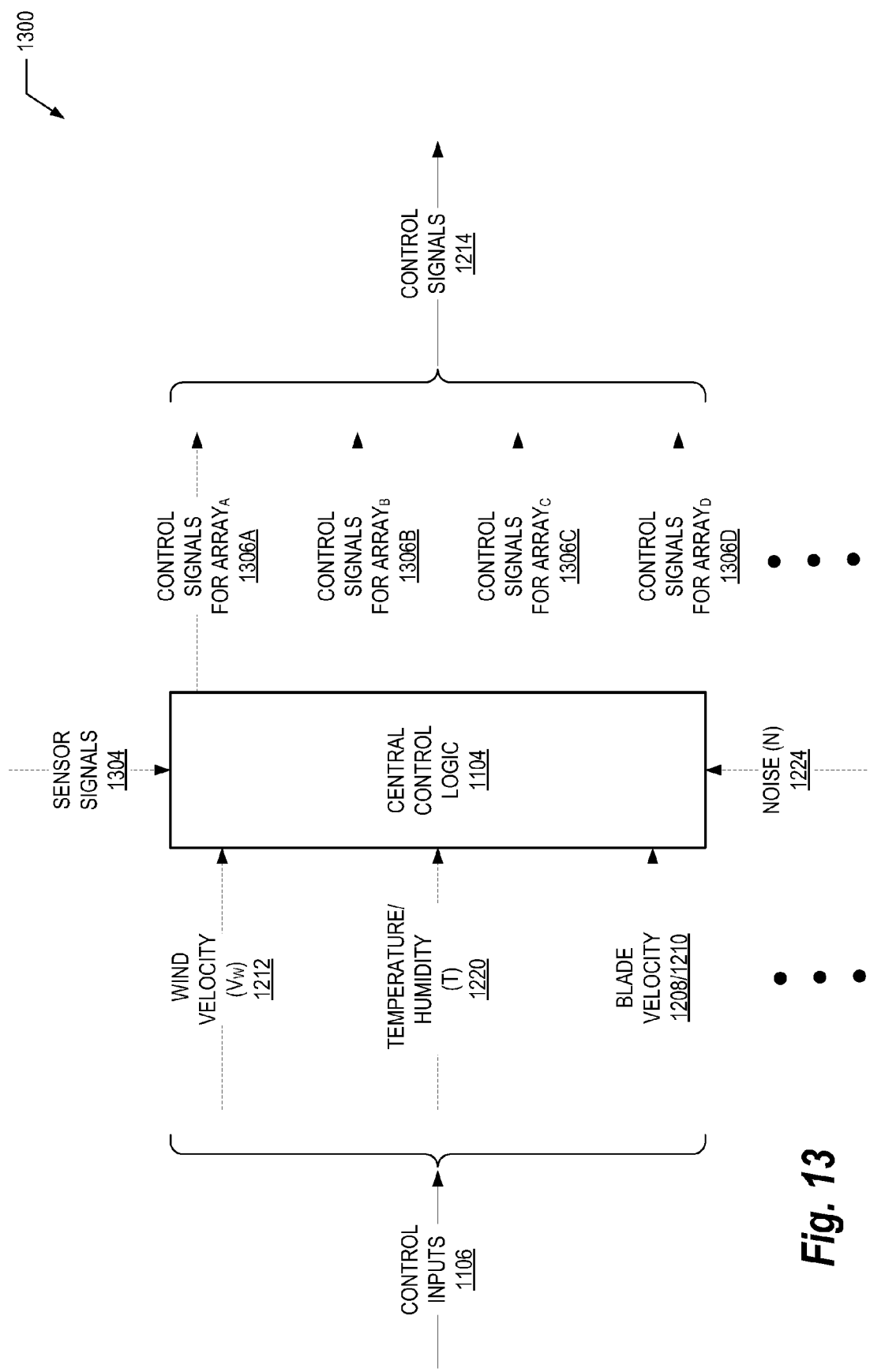
FIG. 13 is a combined block and data flow diagram illustrating processing associated with central control logic for driving control signals to the cascade arrays.
Figure 14:
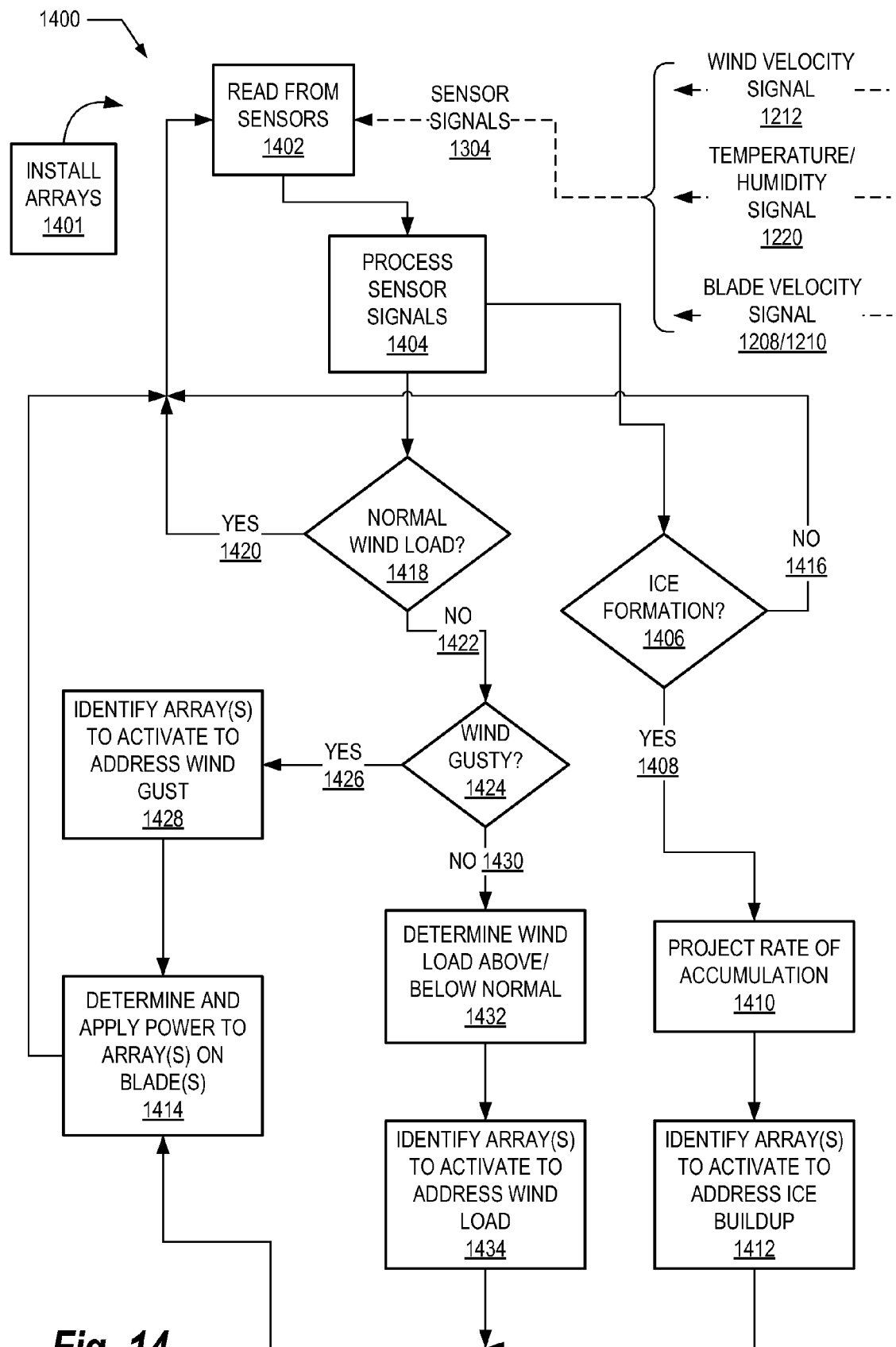
FIG. 14 is a flow chart illustrating processes that the central control logic may perform in calculating the control signals for the various plasma arrays installed on one or more wind turbine blades.

Operation of the central control logic 1104 is described further with FIGS. 13 and 14. However, in overview, the control inputs 1106 may include representations of wind velocity ($V_w$) experienced by the wind turbine 1202 at a given time, as indicated by wind velocity signals 1212. A sensor 1214 may sample ambient wind velocity (i.e., direction and/or magnitude components thereof), and generate the wind velocity signals 1212. The control inputs 1106 associated with driving the plasma arrays 108A-108F may also indicate whether the wind turbine blades 1204, to which plasma arrays are attached, are moving upwards or downwards at that given time.

The control inputs 1106 may also include representations of ambient temperature and/or humidity levels (T), denoted by signals 1220. A temperature and/or humidity sensor 1222 may sample the temperature and/or humidity levels (T), and output the signals 1220.

The control inputs 1106 may also include representations of ambient noise levels (N), denoted by signals 1224. A noise sensor 1226 may sample the noise levels (N), and output the signals 1224.

FIG. 13 illustrates processing, denoted generally at 1300, associated with the central control logic 1104. In general, the central control logic 1104 may receive control inputs 1106 corresponding to any number of different plasma arrays 108, and may generate control signals 1214 that represent electrical waveforms customized for those different plasma arrays 108. As described previously, the control inputs 1106 may include at least signals representing the wind velocity ($V_w$) 1212 experienced by the wind turbine blades to which the plasma arrays 108 are attached. The control inputs 1106 associated with different plasma arrays 108 may also include signals 1208 and 1210 indicating whether, at a given time, the wind turbine blades to which the plasma arrays are attached are moving upward or downward.

In addition to the foregoing control inputs 1106, the central control logic 1104 may receive signals 1224 representing an ambient noise level associated with the wind turbine 1202. The central control logic 1104 may also receive sensor signals 1304 generated by any number of different sensors associated with the wind turbine and/or the wind turbine blades. FIG. 14, described in more detail below, provides various examples of these sensor signals 1304.

The central control logic 1104 may process the sensor signals 1304, the various control inputs 1106, the signals 1304 and 1224 representing the noise levels, and output the control signals 1214. More specifically, the control signals 1214 may include individual control signals 1306A, 1306B, 1306C, and 1306D (collectively, individual control signals 1306). These individual control signals 1306A-1306D may correspond respectively to the plasma arrays 108A-108D. In addition, the individual control signals 1306A-1306D may represent all waveforms customized by the central control logic 1104 for the individual plasma arrays 108A-108D, based on the conditions represented by the control inputs 1106, the sensor signals 1304, and the noise levels 1224.

FIG. 14 illustrates process flows, denoted generally at 1400, that the central control logic 1104 may perform in calculating the control signals 1214 for the various plasma arrays 108 after the plasma arrays 108 are installed on one or more wind turbine blades 1204. For convenience of description, but not to limit possible implementations, certain elements described in previous drawings are carried forward into FIG. 14, and denoted by identical reference numbers.

Turning to the process flows 1400 in more detail, block 1401 represents the installation of the plasma arrays 108 on the wind turbine blades 1204. As discussed above, any number of plasma arrays 108 may be installed on a surface of any number of wind turbine blades 1204, which may include installation at least partially into a recess defined by the wind turbine blade 1204 at any specific area on the entire blade. After installation of the plasma arrays 108, and during operation of the wind turbine blades 1204, block 1402 represents reading input signals from any number of different sensors. Block 1402 may be performed by a receiver of the sensor signals 1304, carried forward from FIG. 13. In the examples shown in FIG. 14, the sensor signals 1304 may include readings of the wind velocity signals 1212, the temperature/humidity signals 1220, and/or at the blade velocity signals 1208 and 1210, all of which are carried forward from FIG. 12. These sensor signals 1304 may also include readings of other signals as well.

Block 1404 represents assessing the sensor signals 1304, to determine any particular operating characteristics of interest relating to the wind turbine 1202 and/or the wind turbine blades 1204. Examples of these operating characteristics may include, but are not limited to, ambient noise levels, icing conditions, prevailing wind velocities, vibration modes along the wind turbine blades, and the like.

From block 1404, the process flows 1400 may proceed to decision block 1406, to evaluate whether ambient conditions indicate that ice formation is possible. For example, block 1406 may include analyzing temperature and/or humidity conditions, as represented by the signals 1220.

If the output of decision block 1406 indicates that ice formation or accumulation may occur, the process flows 1400 may take Yes branch 1408 to block 1410. Block 1410 represents projecting a rate of ice accumulation over time, based at least in part on the temperature/humidity conditions represented by the signals 1220.

Block 1412 represents identifying any plasma arrays (e.g., 108A-108D as shown in FIG. 12) to be activated to offset the projected ice accumulation. For example, ice may accumulate in different areas of the wind turbine blades 1204, depending on different temperature, humidity, and precipitation factors. As the wind turbine blades 1204 rotate, accumulated ice may establish vibration modes in the rotating blades, increase rotating blade's stress and/or decrease efficiency of power extraction. Accordingly, block 1412 may include selecting strategies for operating the plasma arrays 108, to offset these abnormalities attributable to ice buildup. In some cases, block 1412 may include selecting strategies to operate the plasma arrays 108 to establish other effects, suitable to dislodge accumulated ice, or to reduce future ice buildup.

Block 1414 represents determining power levels to apply to different plasma arrays 108, to implement the operational strategy or strategies selected in block 1412. Block 1414 also represents applying the selected power level to the appropriate plasma arrays 108, as located on the different wind turbine blades 1204.

After performing block 1414, the process flows 1400 may return to block 1402, to re-sample these sensor signals 1304. Afterwards, the process flows 1400 may repeat block 1404 and decision block 1406. From decision block 1406, if prevailing conditions indicate that ice formation is not likely, the process flows 1400 may take No branch 1416 to return to block 1402.

In addition to checking for ice formation, the process flows 1400 may also assess the wind loads to which the wind turbine 1204 and/or the blades 1404 are subjected at any given time. Accordingly, decision block 1418 represents whether prevailing wind velocities at a given time are within a given threshold (i.e., "normal"). From decision block 1418, if the prevailing wind conditions are within the applicable threshold (i.e., "normal"), the process flows 1400 may take Yes branch 1420, to return to block 1402.

Returning to decision block 1418, if the prevailing wind conditions are not within the applicable threshold, the process flows 1400 may take No branch 1422 to decision block 1424. Decision block 1424 represents testing for whether prevailing wind conditions may be characterized as "gusty" (e.g., wind velocities surpassing some chosen threshold and sustained over some time). As appreciated from this description, gusting winds may impose significant mechanical loads on the wind turbine 1202 and/or the blades 1204.

If decision block 1424 identifies wind gusts, the process flows 1400 may take Yes branch 1426 to block 1428, which represents identifying one or more plasma arrays 108 to activate to address the wind gust. For example, certain plasma arrays 108 may be activated to create the suppressive airflows described above, to separate the airflows from the surfaces of the blades 1204, and to reduce the susceptibility of the blades to the wind gusts. In this manner, activating the plasma arrays 108 may reduce the mechanical load borne by the blades 1204, reduce the risk of damage to the blades 1204 and/or the wind turbine 1202 due to wind gusts. After performing block 1428, process flows 1400 may proceed to block 1414 to apply power to the plasma arrays 108 that were selected in block 1428.

Returning to decision block 1424, if prevailing wind conditions are determined to be not "gusty", the process flows 1400 may take No branch 1430 to block 1432. Block 1432 represents determining a mechanical wind load borne by the wind turbine blades 1204, and whether this mechanical load is above or below a predefined threshold level. For example, low wind conditions may not be optimal for power generation. Accordingly, block 1432 may include determining how to activate certain plasma arrays 108 to increase operational efficiency in such low wind conditions. In these scenarios, block 1434 may include activating at least some of the plasma arrays 108 to create the aligned airflows described previously.

In other examples, high wind conditions (falling below "gusty" conditions) may impose excessive mechanical loads on the wind turbine blades 1204. In these scenarios, block 1432 may include activating at least some of the plasma arrays 108 to relieve any excessive mechanical loads, for example by creating the suppressive airflows described previously.

Block 1434 represents identifying any number of the plasma arrays 108, to implement the activation strategy defined in block 1432. In turn, the process flows 1400 may proceed to block 1414 to apply power to the plasma arrays selected or identified in block 1434.

Figure 15:
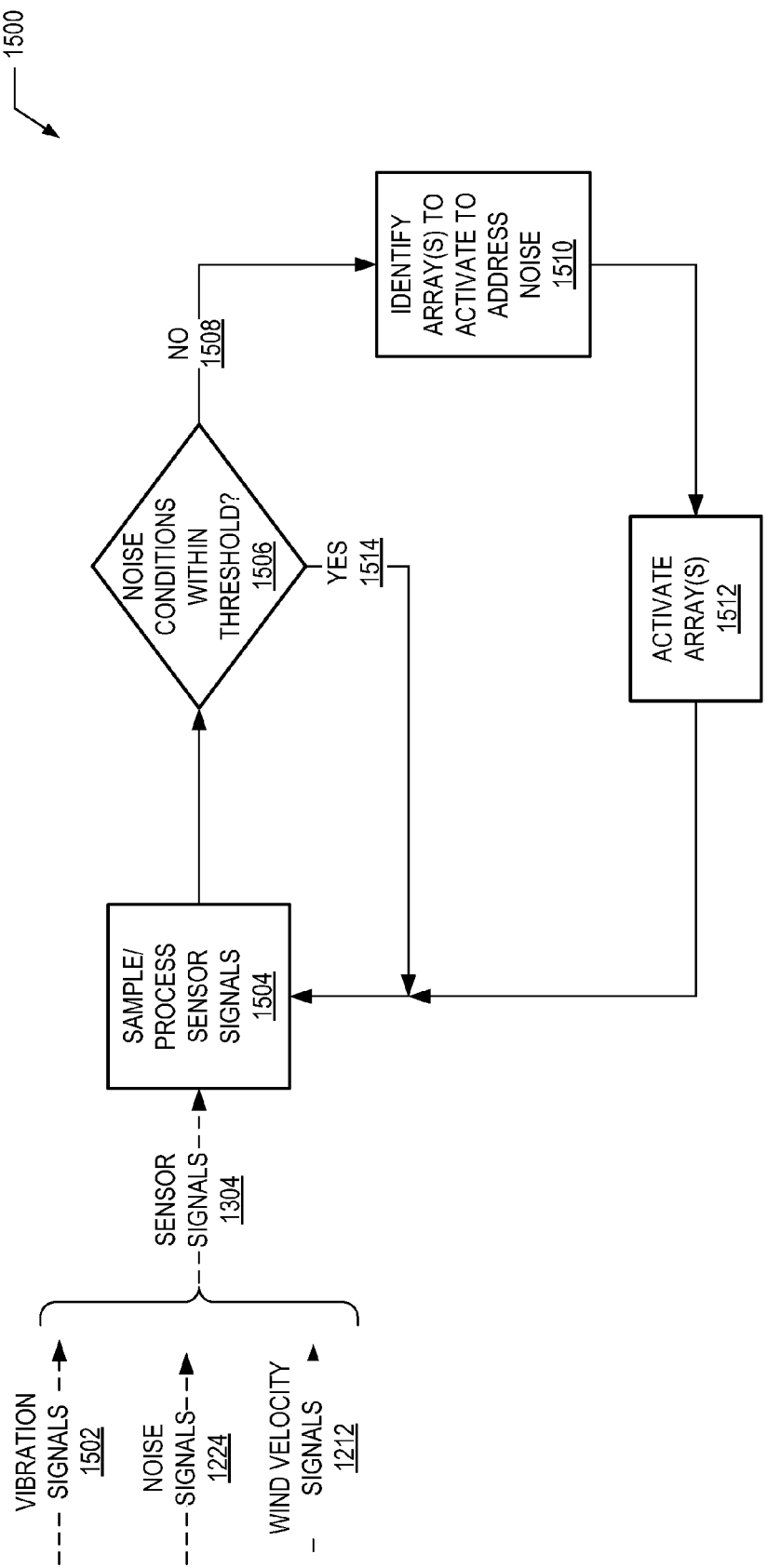
FIG. 15 is a flowchart illustrating further processes that analyze various scenarios for ameliorating noise in connection with activating the plasma arrays.

FIG. 15 illustrates processes, denoted generally at 1500 for analyzing various scenarios for ameliorating noise and vibration in connection with activating the plasma arrays. For example, the wind turbine 1202 may include any number of vibration sensors that generate vibration signals 1502.

FIG. 15 also carries forward examples of the signals 1224 representing ambient noise levels, and the signals 1212 representing wind velocity. The sensor signals 1304 as shown in FIG. 15 may thus represent the signals 1502, 1224, and/or 1212, as well as signals are presenting other ambient conditions affecting the wind turbine 1202 or the blades 1204.

Block 1504 represents sampling and processing the sensor signals 1304. In turn, decision block 1506 represents determining whether ambient noise conditions represented by the sensor signals 1304 are within a given applicable threshold. From decision block 1506, if the ambient noise conditions are above the applicable threshold, the process flows 1500 may take No branch 1508 to block 1510.

Block 1510 represents identifying any number of the cascaded arrays (e.g., 108 in previous Figures) to activate to address the noise conditions. In some cases, excessive noise levels may be attributable to the formation of vortices at the ends of the blades 1204. In these scenarios, block 1510 may include identifying certain cascaded arrays 108 or activation, with these identified arrays being located proximate the ends of the blades 1204. In other cases, noise levels may be attributable to vibration modes affecting one or more blades 1204, with these vibration modes in turn being attributable to any number of different possible factors. In these latter scenarios, block 1510 may include identifying any number of the cascaded arrays 108 for activation to compensate for or offset vibration modes contributing to excessive noise levels. However, it is noted that other scenarios are possible in implementations of this description. In general, block 1510 may include analyzing wind speeds and directions when noise levels are above the threshold considered in block 1506.

Block 1512 represents activating the cascaded arrays identified in block 1510. In the illustrative, but non-limiting, scenarios described above, block 1512 may include activating the identified cascaded arrays to reduce or control formation of blade-tip vortices, to compensate for or offset vibration modes, or the like.

Returning to decision block 1506, if ambient noise conditions are within an applicable threshold, the process flows 1500 may take Yes branch 1514 to return to block 1504. Block 1504, the process flows 1500 may re-sample and process the sensor signals 1304 over time.

Having provided the above description of FIGS. 1 through 15, several observations are noted. The vertical and horizontal disbanding or cascading techniques as described and illustrated herein may generate plasma clusters that are closer together, as compared to previous techniques. In the aggregate, these generated plasma clusters may be larger, as compared to these previous techniques. Thus, these larger plasma clusters may induce greater movements of air, and provide greater levels of control over the separation point or over a tip vortex or span- or stream-wise airflow on a given wind turbine blade.

In addition, by providing two-dimensional disbanding of the plasma generation units, the electrode-dielectric units described herein may reduce or minimize the effect of counterforces acting between neighboring electrode pairs, as compared to the previous techniques. In some previous approaches, multiple plasma generation units may be placed on a single dielectric. However, if these plasma generation units are placed too close together, then the plasma clusters generated by neighboring units may exert counterforces on one another, reducing the overall size of the plasma clusters.

In some implementations, the various electrodes and dielectrics described herein may have thicknesses of approximately 0.5 mm or below. Cascaded arrays of plasma generating units constructed to this scale may provide more plasma-generating units per unit length of airfoil, as compared to previous techniques. With more plasma-generating units per unit length of airfoil, more plasma may also be generated per unit length of a blade.

Reduced power consumption may result from managing and controlling airflow locally at the plasma-generating units. In contrast, previous techniques may control airflow from a centralized location that manages the plasma-generating units remotely.

Although the previous Figures illustrate certain example configurations of the plasma-generating units, implementations of this description may also include plasma-generating units having other configurations as well. These configurations may be suitable for inducing vortex air patterns, or other types of complex airflows.

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

What is claimed is:

1. A method of actively controlling airflow over at least one wind turbine blade, the method comprising:
    providing at least one plasma actuated cascade array, wherein the plasma actuated cascade array includes a plurality of dielectrics and a plurality of electrodes comprising a first electrode disposed along a first dielectric, a second electrode sandwiched between the first dielectric and a second dielectric, and at least a third electrode, wherein the second dielectric is sandwiched between the second and third electrodes, wherein the electrodes and the dielectrics are electrically operative to generate plasma clusters and to induce directional airflows associated with the plasma clusters; and
    configuring at least one plasma actuating cascade array based on, at least in part, one characteristic of the wind turbine blades.

2. The method of claim 1, wherein configuring the at least one plasma actuated cascade array includes adjusting a length of a portion of at least two of the dielectrics, as exposed between three electrodes adjacent to the dielectrics, based at least in part on the characteristic of the wind turbine blades.

3. The method of claim 2, wherein configuring the at least one plasma actuated cascade array includes adjusting the lengths of a plurality of portions of the dielectrics, as the portions of the dielectrics are exposed between respective pairs of electrodes, based at least in part on the characteristic of the wind turbine blades.

4. The method of claim 1, wherein configuring at least one plasma actuated cascade array includes configuring the plasma actuated cascade array based on a cross-sectional profile of the wind turbine blade.

5. The method of claim 1, wherein configuring at least one plasma actuated cascade array includes configuring the plasma actuated cascade array based on a wind speed expected to be encountered by the wind turbine blade.

6. The method of claim 1, wherein configuring at least one plasma actuated cascade array includes configuring the plasma actuated cascade array based on response to mechanical loads, wherein the mechanical loads include vibration, drag forces, noise producing effects, ice-formation or wind loads as encountered by the wind turbine blade.

7. The method of claim 1, wherein configuring at least one plasma actuated cascade array includes configuring the plasma actuated cascade array to have a first angled configuration that is chosen based upon the characteristic of the wind turbine blade.

8. The method of claim 7, further comprising configuring at least a further plasma actuated cascade array to have a further angled configuration that is chosen based upon a further characteristic of the wind turbine blade.

9. A method for providing active airflow control over a wind turbine blade, the method comprising:
    providing a plasma actuated cascade array, wherein the plasma actuated cascade array includes a plurality of dielectrics and a plurality of electrodes comprising a first electrode disposed along a first dielectric, a second electrode sandwiched between the first dielectric and a second dielectric, and at least a third electrode, wherein the second dielectric is sandwiched between the second and third electrodes, wherein the electrodes and the dielectrics are electrically operative to generate plasma clusters and to induce directional airflows associated with the plasma clusters; and installing the plasma actuating cascade array onto the wind turbine blade.

10. The method of claim 9, wherein installing the plasma actuated cascade array includes installing the plasma actuated cascade array onto a surface of the wind turbine blade.

11. The method of claim 9, further comprising installing at least a second plasma actuated cascade array onto the wind turbine blade.

12. The method of claim 9, further comprising installing at least a second plasma actuated cascade array onto at least another wind turbine blade.

13. The method of claim 9, wherein installing the plasma actuated cascade array includes installing the plasma actuated cascade array at least partially into a recess defined by the wind turbine blade at any specific area on the entire blade.

14. A method of actively controlling at least one direction of airflow passing over a wind turbine blade using at least one plasma actuated cascade array installed onto the wind turbine blade, the method comprising:

providing electrical power in the form of a custom waveform to the plasma actuated cascade array comprising a first electrode disposed along a first dielectric, a second electrode sandwiched between the first dielectric and a second dielectric, and at least a third electrode, wherein the second dielectric is sandwiched between the second and third electrodes, wherein the custom waveform is defined so as to actively control at least one airflow passing over the wind turbine blade by generating at least one plasma cluster;

generating at least one plasma cluster proximate the plasma actuated cascade array during a first phase of the electrical power;

moving the plasma clusters along the plasma actuated cascade array in response to a further phase of the electrical power; and generating directional airflow in response to movement of the plasma clusters.

15. The method of claim 14, further comprising modifying movement of the airflow over the wind turbine blade in response to directional airflow generated using the plasma actuated cascade array.

16. The method of claim 15, wherein modifying movement of the airflow over the wind turbine blade includes moving the airflow more closely to or further from the wind turbine blade.

17. The method of claim 14, further comprising:

providing further electrical power in the form of a further custom waveform to at least a further plasma actuated cascade array installed onto the wind turbine blade or onto a further wind turbine blade, wherein the further custom waveform is defined to actively control at least a further airflow passing over the wind turbine blade or the further wind turbine blade;

generating at least a further plasma cluster proximate the further plasma actuated cascade array during a first phase of the further electrical power;

moving the further plasma cluster along the further plasma actuated cascade array in response to a further phase of the further electrical power; and generating further directional airflow in response to movement of the further plasma cluster.

18. The method of claim 17, wherein generating the directional airflow includes generating airflow in a first direction, and wherein generating the further directional airflow includes generating airflow in a second direction that is different than the first direction.

19. The method of claim 18, further comprising combining the directional airflow and the further directional airflow into a combined airflow.

20. The method of claim 19, further comprising coordinating the electrical power and the further electrical power as supplied respectively to the plasma actuated cascade array and the further plasma actuated cascade array, to coordinate movement of the directional airflow relative to the further directional airflow.

21. An array of electrodes for generating plasma for actively controlling airflow over at least one wind turbine blade, the array comprising:

a first electrode disposed along a first dielectric;

a second electrode sandwiched between the first dielectric and a second dielectric;

at least a third electrode, wherein the second dielectric is sandwiched between the second and third electrodes;

at least one power supply providing electrical power to the first, second, and at least third electrodes; and a power supply controller operative to control the power supply, so as to regulate the electrical power supplied to the first, second, and at least third electrodes, and so as to cause the first, second, and at least third electrodes to generate and move plasma, thereby actively controlling airflow over the at least one wind turbine blade.

22. The array of claim 21, wherein the power supply is configured to apply a waveform to the first, second, and third electrodes.

23. The array of claim 22, wherein the first, second, and third electrodes are configured to generate respective plasma clusters in response to a first phase of a cycle of the applied waveform.

24. The array of claim 23, wherein the first, second, and third electrodes are configured to move the plasma clusters in response to a further phase of a cycle of the applied waveform.

* * * * *